(12) United States Patent
Novek

(10) Patent No.: US 10,514,021 B2
(45) Date of Patent: Dec. 24, 2019

(54) UNDERWATER ENERGY STORAGE AND ELECTRICITY

(71) Applicant: Ethan J. Novek, Greenwich, CT (US)

(72) Inventor: Ethan J. Novek, Greenwich, CT (US)

( * ) Notice: Subject to any disclaimer, the term of this patent is extended or adjusted under 35 U.S.C. 154(b) by 0 days.

(21) Appl. No.: 16/409,793

(22) Filed: May 11, 2019

(65) Prior Publication Data
US 2019/0345911 A1    Nov. 14, 2019

Related U.S. Application Data

(60) Provisional application No. 62/670,133, filed on May 11, 2018.

(51) Int. Cl.
*F03B 13/26* (2006.01)
*E02B 9/08* (2006.01)

(52) U.S. Cl.
CPC .............. *F03B 13/264* (2013.01); *E02B 9/08* (2013.01); *F03B 13/268* (2013.01)

(58) Field of Classification Search
CPC ................................. F03B 13/264; E02B 9/08
See application file for complete search history.

(56) References Cited

U.S. PATENT DOCUMENTS

| | | | | |
|---|---|---|---|---|
| 1,820,652 A * | 8/1931 | Eberhardt | ............. | F03B 13/264 417/119 |
| 4,098,081 A * | 7/1978 | Woodman | ............. | F03B 13/266 417/100 |
| 4,288,985 A * | 9/1981 | Dyck | .................... | F03B 13/086 137/132 |
| 4,645,377 A * | 2/1987 | Vesterby | .................. | E02B 3/04 405/15 |
| 5,191,225 A * | 3/1993 | Wells | ....................... | E02B 9/08 290/42 |
| 5,222,833 A * | 6/1993 | Gorlov | ...................... | E02B 9/08 290/53 |
| 5,909,060 A * | 6/1999 | Gardner | ................... | E02B 9/08 290/42 |
| 7,564,143 B1 * | 7/2009 | Weber | ..................... | F03B 13/06 290/42 |
| 9,039,326 B1 * | 5/2015 | Novek | ..................... | E02B 9/08 405/76 |
| 2005/0087117 A1 | 4/2005 | Scott et al. | | |
| 2006/0233613 A1 * | 10/2006 | Welch, Jr. | ................ | E02B 9/08 405/76 |

(Continued)

OTHER PUBLICATIONS

Scardino et al., "Fouling control using air bubble curtains: protection for stationary vessels", No. A13, J. Marine Engin. & Tech. (2009), pp. 3-10.

(Continued)

*Primary Examiner* — Sean Gugger
(74) *Attorney, Agent, or Firm* — Gregory L. Porter; Hunton Andrews Kurth LLP

(57) ABSTRACT

The present invention relates to systems and methods for pumping or removing a fluid from a region within or on top of or in contact with a water or liquid body and applications for said systems and methods. Some embodiments may be applicable to, for example, inhibiting or preventing growth formation or fouling of structures in liquid environments. Other embodiments may be applicable to, for example, an energy storage device or a tidal power energy generation system.

7 Claims, 14 Drawing Sheets

(56) References Cited

U.S. PATENT DOCUMENTS

| | | | |
|---|---|---|---|
| 2007/0292259 A1* | 12/2007 | Choie | F03B 13/264 |
| | | | 415/8 |
| 2009/0127859 A1* | 5/2009 | Jones | F03B 13/06 |
| | | | 290/53 |
| 2009/0293469 A1* | 12/2009 | Chen | F03B 13/06 |
| | | | 60/398 |
| 2010/0077749 A1* | 4/2010 | Riley | F24T 10/20 |
| | | | 60/641.2 |
| 2014/0060028 A1 | 3/2014 | Schmidt-Bocking et al. | |
| 2014/0183122 A1* | 7/2014 | Canals | E02B 9/08 |
| | | | 210/251 |
| 2016/0273512 A1* | 9/2016 | Nanehkaran | E02B 9/08 |
| 2018/0030958 A1* | 2/2018 | Sant | F03B 13/06 |

OTHER PUBLICATIONS

Bullard et al., "The use of aeration as a simple and environmentally sound means to prevent biofouling", 26(5) (Jul. 2019), pp. 587-593.
"Dock Cleaning", www.scubadubacorp.com , https://www.scubadubacorp.com/Dockcleaning.htm.
Slocum et al, Ocean Renewable Energy Storage (ORES) System: Analysis of an Undersea Energy Storage Concept, 101(4) Proc of IEEE (Apr. 2013), pp. 906-924.

\* cited by examiner

UNDERWATER ENERGY STORAGE AND ELECTRICITY

CROSS REFERENCE TO RELATED APPLICATIONS

The instant application claims priority to provisional application No. 62/670,133 filed May 11, 2018 which is hereby incorporated by reference in its entirety.

BACKGROUND OF INVENTION

Scaling, fouling, other 'growths', and corrosion can be damaging to water infrastructure and other liquid infrastructure. Scaling, fouling, other 'growths', and corrosion can reduce infrastructure lifespan, infrastructure structural integrity, the efficiency of boats and other water vehicles through increased drag and weight, clog pipes, and reduce the buoyancy of docks and buoys.

Prior art technologies for preventing scaling, fouling, and other 'growths' include anti-foulants and antiscalants. Antifoulants and antiscalants have multiple significant disadvantages. They are generally bad for environment and may be toxic to aquatic ecosystems. They are generally only temporary and require re-application or replacement for continued effectiveness. They are generally expensive, including due to material cost, application cost, and their temporary nature.

In docks and other permanent or semi-permanent aquatic infrastructure, it is common to not employ anti-foulants and antiscalants. Generally, barnacles and/or other growths are periodically removed from the bottom of docks. Barnacles and other growths can add significant weight to docks and can damage or puncture dock pontoons. Removal is expensive, labor intensive, and only a temporary solution.

SUMMARY OF THE INVENTION

The present invention relates to systems and methods for pumping or removing a fluid from a region within or on top of or in contact with a water or liquid body and applications for said systems and methods.

Some embodiments may be applicable to, for example, inhibiting or preventing growth formation or fouling of structures in liquid environments. Said liquid environments may comprise aqueous and/or non-aqueous environments. Some embodiments described herein may inhibit or eliminate or prevent growth formation or fouling without the need for coatings, paint, manual cleaning/scrubbing, or other methods described in the art. Growth formations may include, but are not limited to, one or more or a combination of the following: marine growths, foulants, marine creatures, marine animals, inorganic scaling, organic scaling, barnacles, mussels, clams, oysters, worms, shrimp, crustaceans, biofilms, algae, bacteria, fungi, or ameba. Moving parts for said embodiments related to inhibiting or preventing growth formation or fouling or corrosion of structures in liquid environments, such as pumps and generators, if desired, may be located entirely above the surface of a water or liquid body.

Some embodiments may be applicable to, for example, increasing or decreasing the height of a floating structure, such as a dock. Some embodiments described herein may involve increasing the height of a floating structure above the surface of a liquid by pumping air into a concave region within or beneath said floating structure such that the air or other gas or other low-density fluid at least partially displaces a portion of water in said concave region. Similarly, the height of a floating structure above the surface of a liquid may be decreased by allowing gas to escape from or by pumping gas out of said concave region. Air or other gas may be transferred in or out of said concave region using one or more tubes. The concave region may be open to the water or other liquid. If advantageous, the pumping or release of gas may be conducted using moving parts entirely outside of the water or liquid body. By having moving parts outside of and not in contact with water or the liquid, the moving parts (e.g. air pump) may comprise lower cost equipment, may be less susceptible to fouling, and may have a longer lifespan.

Some embodiments may be applicable to, for example, an energy storage device. Some embodiments may involve a storage region beneath the surface of a water or liquid body and a storage region near the surface or above a water or liquid body. To 'charge' said energy storage device, low density fluid, such as a relatively lower density liquid or a gas, may be pumped into said storage region, displacing a higher density fluid, such as water. To discharge said energy storage device, said higher density fluid may be allowed to displace said lower density fluid, generating electricity due to the flow of the lower density fluid through an electric generator. Moving parts for said energy storage device, such as pumps and generators, if desired, may be located entirely above the surface of a water or liquid body.

Some embodiments may be applicable to, for example, a tidal power energy generation system, which generates energy from change in water level due to, for example, tides. Some embodiments may involve using the displacement of air or other fluid from a storage region due to a rise in water level due to tides to generate energy, such as electricity. Some embodiments may involve using the movement of air or other fluid into a storage region due to a decrease in water level due to tides to generate electricity. Moving parts for said tidal power system, such as pumps and generators, if desired, may be located entirely above the surface of a water or liquid body.

It is important to note that embodiments described herein may be combined and the systems and methods described herein may overlap or have multiple simultaneous applications.

BRIEF DESCRIPTION OF DRAWINGS

FIG. 4 may show height increasing.

FIG. 5 may show height decreasing.

FIG. 7 may show an energy storage embodiment undergoing charging.

FIG. 8 may show an energy storage embodiment at a relatively charged state.

FIG. 9 may show an energy storage embodiment discharging.

FIG. 10 may show an energy storage embodiment at a relatively discharged state.

FIG. 11 may show an example embodiment where the LDL and/or HDL storage regions at a higher head height or above the surface are located on a platform or a floating platform.

FIG. 12 may show an example embodiment where the LDL and/or HDL storage regions at a higher head height or above the surface are located on land.

FIG. 13 may show an example embodiment where multiple subsurface storage regions are employed for energy storage and/or chemical storage.

FIG. 14 may show an embodiment where electricity is being generated.

FIG. 15 may show an embodiment where the storage region is nearly full with water.

FIG. 16 may show an embodiment generating electricity when the surrounding water body water level is relatively low compared to the water level inside the storage region.

FIG. 17 may show an embodiment where the storage region is nearly empty with water.

FIG. 18 may show an embodiment where the storage region is fully empty with water.

FIG. 19 may show an embodiment where air is pumped into a storage region to remove or displace residual water.

FIG. 20 shows an example embodiment where water/air cavity or storage region contains a porous material.

FIG. 21 shows an example embodiment where water/air cavity or storage region contains a porous material.

FIG. 22 shows an example embodiment where water/air cavity or storage region contains a porous material.

FIG. 23 shows an example embodiment where water air cavity or storage region contains a porous material.

FIG. 24 shows an example embodiment where water/air cavity or storage region is located on or within a water body.

FIG. 25 shows an example embodiment where water/air cavity or storage region is located on or within a water body.

FIG. 26 shows an example embodiment where water/air cavity or storage region is located on or within a water body.

FIG. 27 shows an example embodiment where water/air cavity or storage region is located on or within a water body.

FIG. 28 shows an example embodiment where water/air cavity or storage region is located on or within a water body.

FIG. 29 shows an example embodiment with a floating pump or generator station.

DETAILED DESCRIPTION OF THE INVENTION

First Description of Embodiments

Figure 1:
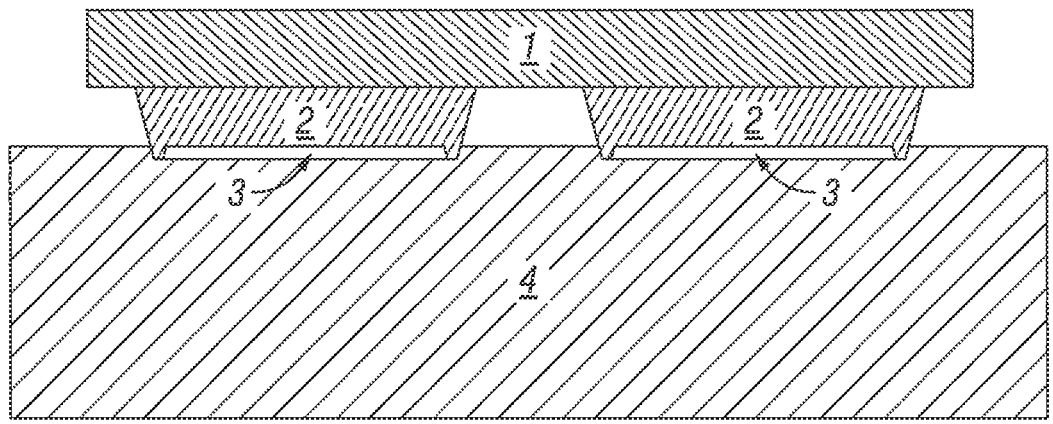
FIG. 1: An example dock with a concave region 'gas pocket' ('3') on the bottom of each float or pontoon.

An example embodiment may involve 'walls' connected to the bottom or sides of a liquid structure. A liquid structure may include, but is not limited to, one or more or a combination of the following: floating structure, a dock, buoy, platform, float, boat, flat bottom boat, skiff, or surface structure. A liquid structure may also include structures which are anchored to land or at least partially supported by land, while also being in or near or in contact with water or immersed in water or in contact with water or in contact with another liquid.

In an example embodiment, the structure may be a dock (please note: a dock is provided as an example floating structure, the elements of the embodiment described herein may be applicable to other floating or non-floating structures described herein). Connected or as a component of the dock or as a feature of the shape of the bottom of the dock are 'walls' which may be connected to the side or bottom of the dock or near the perimeter of the bottom of the dock. Alternatively, the shape of the bottom of the dock may be tailored to have said 'walls', as in, for example, said 'walls' may be part of the shape of the dock rather than a connected separate material. Said 'walls' may protrude beyond the vertical water depth of most or all of the floating dock in contact with the water. The connection of the 'walls' to the structure may be ideally air or water tight. Said 'walls' may simply comprise a concave structure or protruding portions of a concave structure.

Said walls may result in the formation of concave region or cavity located, for example, near the bottom of a floating structure or comprise most of the bottom of a floating structure. In the present embodiment, a gas may occupy at least a portion of said concave region. Said gas may include, but is not limited to, one or more or a combination of the following: air, nitrogen, water vapor, methane, hydrogen, flue gases, carbon dioxide, oxygen, inert gas, argon, helium, practically water insoluble gas, hydrocarbon, ozone, or a combination thereof. The gas may be at least temporarily or semi-permanently or practically permanently 'trapped' in said concave region. Said 'trapped' gas in said concave region may be referred to as a 'gas pocket' or an 'air pocket'. Said gas remains in said concave region due to, for example, 1) greater density of water than the gas; and/or 2) the gas' practical inability to pass through the water/gas interface; and/or 3) the relative gas tightness or gas tight seal of the concave region.

An operating principle of the air pocket may be demonstrated by using a simple empty drink cup and a container filled with water. When an empty drink cup is flipped upside-down and submerged beneath the surface of the water in an upside-down position, air in said drink cup may be trapped inside said drink cup as water may be unable to replace said air because the air cannot escape upward through the drinking cup. Said trapped air may be an example of an air pocket and the region inside the cup where the air is trapped may be an example of a concave region or cavity. An example application where said air pocket effect has been employed in prior art may include 'diving bells'.

Said gas pocket or air pocket may result in the formation of a separation or non-contiguous separation between the water and at least a portion of the surface of the concave region. Water may be separated from contact with at least a portion of the solid surface of the of the concave region due to the physical separation or barrier of the gas pocket between the water and said solid surface. A significant portion of the surface area of the solid surface of the concave region may be in contact with said gas pocket. A significant portion of the surface area of water displaced by the air pocket may be in contact with the air pocket at an air-water interface. Said concave region or surface area in contact with said gas pocket may comprise a significant portion of or nearly all the surface area of the bottom of, for example, the bottom of a surface structure. Said concave region or surface area in contact with said gas pocket may comprise a significant portion of or nearly all the surface area which may be exposed to or vulnerable to or would otherwise be in contact with water or other liquid. Said significant portion may comprise greater than 5%, or greater than 10%, or greater than 20%, or greater than 30%, or greater than 40%, or greater than 50%, or greater than 60%, or greater than 70%, or greater than 80%, or greater than 90%, or greater than 95% of the bottom of the surface of a structure in contact with a liquid or water body.

Fouling or scaling or growth formation may be inhibited by said separation or non-contiguous separation between the liquid and at least a portion of the surface of the concave region resulting from, for example, said gas pocket. Fouling or scaling or growth formation generally occurs in a water environment when water is in direct contact with a solid surface. Said air pocket enables a substantial surface area of water, which may otherwise be in contact with solid surface, to be in contact with a water-gas or water-air interface rather than with a solid surface. Said gas separation or air barrier prevents liquid-borne or water-borne foulants or scalants or growths to adhere the said solid surface. Said concave region may comprise at least a portion of the surface area of the bottom of a floating structure or structure in contact with liquid. Said concave region may comprise a substantial portion or most or almost all the surface area of the bottom of said floating structure or structure in contact with liquid, which may enable a substantial reduction in fouling or scaling or growth formation relative the same structure without a gas pocket or air pocket.

Foulants or scalants or growths generally adhere to surfaces from water through direct contact with a solid surface. Water-borne foulants or scalants or growths generally cannot pass through air or other gas to a solid surface. In an instance where water-borne foulants or scalants or growths are somehow capable of passing through air or other gas to a solid surface, it is important to note that mass transfer through said gas may be orders of magnitude less than if water was in direct contact with a solid surface. As a result, water-borne foulants or scalants or growths may have insufficient mass transfer to conduct substantially any or relatively equivalent fouling, scaling, or growth in a gas or air environment relative to an environment of direct solid surface contact with water.

Gas pockets or concave regions or both may increase or decrease stability. Stability may be increased, for example due to 'suction' effect or attraction created by a structure with gas-solid interface on one side and solid-water interface on the other side. Stability may be increased by, for example, reducing the center of gravity of the dock by, for example, adding weight to the 'walls' of a concave region. By adding weight to the walls of a concave region or near the bottom of the structure, the structure may be less likely to tilt sufficiently to lose gas in a gas pocket, in the event of, for example, a weight imbalance on the structure or a large wave. Gas pockets or concave regions may decrease stability by potentially increasing center of gravity. If a structure is in an environment with significant waves or the potential for rough water, it may be desirable, for example, to incorporate a gyroscopic stabilizer or stabilizing anchors or stabilizing weights or stabilizing earth connected structures to increase stability or minimize tilting.

Gas pockets or concave regions or surface modifications which enable gas pockets may be employed to prevent corrosion or degradation. For example, a corrosion sensitive material or device may be placed in a gas pocket when stored underwater. For example, the propeller of a boat may be surrounded a gas pocket when the propeller or boat is not in use, which may be enabled by encasing or surrounding said propeller with a concave region. For example, underwater hydraulic equipment or underwater trim-tabs may be surrounded a gas pocket when, for example, not in use.

A tube may be placed in the gas pocket or the concave region and gas (for example, including, but not limited to, gases described herein, such as air or nitrogen) may be pumped into the concave regions using said tube and/or a gas pump (which may be connected to said tube). One of the openings of the tube may be placed inside said concave region or below said concave region. The initial pumping of gas into said concave region may enable the formation of a gas pocket in said concave region. After the formation of a gas pocket, additional gas may be pumped into said region to, for example, including, but not limited to, one or more or a combination of the following: expand said gas pocket, to replace gas which may have escaped from said gas pocket, or enable an overflow or spillover of excess gas from said gas pocket and concave region.

Said concave region or gas pocket may be infiltrated with water on, for example, an occasion of a large wave or when a structure is tilted at a significant angle. It may be advantageous for said water contact to be temporary or of as short duration as possible to minimize potential scaling or fouling or corrosion resulting from, for example, water contact. One means of potentially minimizing frequency of water contact may comprise pumping air or other gas into said concave region or cavity using, for example, a tube or pressurized air tank. Said air or other gas may be pumped continuously into said concave region or may be pumped into said concave region only on certain occasions. For example, said certain occasions may comprise when the gas pocket or air pocket is at risk of losing air or at risk of water infiltration into the concave region. For example, said certain occasions may comprise when a structure tilts beyond a specified angle, which may be triggered or measured, for example, using devices for measuring angle change or movement known in the art. For example, said certain occasions may comprise when a portion of the solid surface of said concave region is wetted or at least partially wetted or in contact with water, which may be triggered or measured, for example, using a water or wetting sensor or similar devices known in the art.

It may be desirable for the 'walls' to be durable and capable of handling the weight of the dock or multiple docks and resistant to the abuse from other objects or elements. For example, said wall may comprise an a 'skirt', for example, wherein the material may be structurally bendable, however can store an air pocket. Said 'skirt' may be similar to the 'skirt' employed in hovercrafts, although, unlike hovercrafts, the skirt may remain in part or in whole beneath the surface of the water.

An example durable wall comprises a tube connected to the bottom of the dock and attached, for example, near the outside perimeter of the dock bottom and may be surrounding the outside perimeter of the dock. To prevent damage to the 'walls', the tube may be collapsible when the dock is being moved. The tube may be inflated or may become more rigid using, for example, including, but not limited to, pneumatic or hydraulic pressure means, such as pneumatic or hydraulic pressure or filling with a pneumatic or hydraulic fluid. Said tube may be connected to the dock in a fashion which prevents air or water from passing through the connection between the dock and the tube 'walls'.

The present invention and/or elements of the present invention, which may include, but are not limited to, 'Wall', gas pocket, concave region, tube, gas pump or air pump, and/or other elements of the embodiments described herein, may be retrofitted onto pre-existing structures or may be an element of new structures.

The present invention may also be applicable to preventing or minimizing foulants or scalants or growths in non-aqueous liquid environments.

Portions of a floating structure may be in contact with water or liquid, for example, which may include solid surfaces outside a concave region or gas pocket. Said solid surfaces in contact with water or liquid may be susceptible to growths, fouling or scaling. It is important to note that a large portion of the solid surface area beneath the surface of the water or liquid may be in contact with a gas pocket, and, as a result, may be unsusceptible or less prone to the formation of growths, fouling or scaling. This may have an effect of significantly reducing or eliminating the formation of growths, fouling or scaling on most of the subsurface surface area of a solid structure. Surfaces in contact with water or liquid may have the formation of growths, fouling or scaling, however it may be important to note 1) side-walls are generally easier to clean/scrub than the bottom/underbody/underbelly of a floating structure; 2) the total amount of the formation of growths, fouling or scaling may be significantly less than if the present invention was not employed; 3) an air curtain may be created which minimizes growth formation on regions not protected by an air pocket by pumping excess air into said cocave region and facilitating the formation of small air bubbles, which may rise along the sides of the structure.

Water may refer to a body of liquid. Said body of liquid may include, but is not limited to, a body of liquid containing at least a portion of water including salt water. Said body of liquid may include, but is not limited to, marine environments, aquatic environments, rivers, lakes, brine pools, frac water, waste water, oil storage, chemical storage, or other liquids environments.

A gas pocket may be trapped or stationary in low turbulence or minimal turbulence or non-turbulent conditions. Non-turbulent conditions may include an environment where the water is calm and non-moving to the naked eye and the structure in said water is also non-moving to the naked eye. Low turbulence or minimal turbulence conditions may include an environment where the water is calm and moving to the naked eye and/or the structure in said water is calm and moving to the naked eye. In a low turbulence environment, although there is discernable movement, the movement of the water or structure is insufficient for more than 10%, or more than 20%, or more than 25%, or more than 30%, or more than 40%, or more than 50% of the gas in the gas pocket to escape from beneath the structure in a 30 second period. It is important to note, said gas escape may not include intentional removal of gas from said gas pocket or the escape of gas through a tube interconnected to said gas pocket.

Some embodiments may be employed to encourage growth formation, such as certain forms of growth. For example, embodiments described herein, such as gas pockets, may be formed in a certain region to kill an invasive species of algae or the eggs of an invasive fish, other potentially harmful water borne life form. For example, a gas pocket may enable localized oxygenation. For example, a gas pocket may enable localized de-oxygenation. For example, a gas pocket may enable localized cooling, which may comprise evaporative cooling, which may increase the longevity of or improve the health of, for example, coral. For example, a gas pocket may enable localized pH adjustment, such as pH increase by $CO_2$ removal or $CO_2$ gas stripping.

Example Embodiment Equipment and Description

Example cost estimates for a dock module:
Large Dock Module Dimensions: 8 meters long×5 meters wide×¾ meter tall.
Contains concave region on bottom of dock which is about 5 meters long, 3 meters wide, and 0.07 meter deep (1.05 cubic meters total volume of concave region).
The below cost estimates assume the dock either was built with a concave region or retrofitted with a concave region
Example Equipment for Embodiment with Grid Electricity Source on Dock (Material CAPEX):
  Air pump—for example: 0.38 PSI, 200 Liters per minute, 35 watts, $12
  ½ inch inside diameter vinyl tubing, 50 ft: $30
  Low power timer breakout: $13
  Triple-Axis Gyro Breakout Board (which may also trigger on/off switch when angle of dock changes): $12.50
  Total CAPEX: $67.50
Example Embodiment with Grid Electricity Source on Dock (Annual OPEX with On-Off Timer):
  Assumes Pump Operates on a Timer of 2.5 minutes every 30 minutes or 5 minutes per 1 hour
  Pump annual electricity consumption: 25.55 kWh
  Annual electricity cost at $0.10 per kWh: $2.55
Example Embodiment with Solar Panel with Battery Setups for Electricity Source on Dock (CAPEX):
  Air pump—for example: 0.38 PSI, 200 Liters per minute, 35 watts, $12
  ½ inch inside diameter vinyl tubing, 50 ft: $30
  Low power timer breakout: $13
  Triple-Axis Gyro Breakout Board (which may also trigger on/off switch when angle of dock changes): $12.50
  Total CAPEX: $67.50 (if solar panel and battery are expensed as CAPEX, $108.13 total)
Example Embodiment with Solar Panel with Battery Setups for Electricity Source on Dock (Annual OPEX with On-Off Timer):
  Assumes Pump Operates on a Timer of 2.5 minutes every 30 minutes or 5 minutes per 1 hour
  Pump annual electricity consumption: 25.55 kWh
  Solar panel (determined based on 10% capacity factor, one 100 W solar panel for three dock modules): $28.63 per dock module
  264 Wh Battery for 3 dock modules (1.17 days of storage): $25 per dock module
  OPEX of Electricity: $0
  Battery Lifespan: 5-10 years
  Cost of Battery per Year (assuming 5-year lifespan): $5

Solar Panel Lifespan: 25 years
Cost of Solar Panel per Year (assuming 25-year lifespan): $1.15
Total Annual OPEX: $6.15
Example Minimum Viable Prototype Materials:
1-3 Watt DC Aquarium Air Pump
Timer breakout on-off switch which, for example, automatically turns on the air pump for 20 seconds every 10 minutes
    Examples
        Adafruit TPL5110 Low Power Timer Breakout
        Mini Timer Time Delay Relay 0.1 Sec to 400 days.
Small re-chargeable battery bank, such as 10 Wh battery bank for smartphone charging
Tube to connect air pump and bottom of plastic bin
Plastic bin with subtle perimeter lip which creates rectangular concave region on the plastic container bottom. Alternatively, an upside-down plastic bin may be employed to simulate the concave region.
Plastic bin to store electronic devices outside the water Example Exemplary Embodiments System for fouling and scaling prevention on water structures comprising:
    A structure containing a concave region
    Wherein said concave region contains a gas pocket
    Wherein said gas pocket results in a non-contiguous separation between a water and at least a portion of the surface of said concave region
System for fouling and scaling prevention on water structures comprising:
    A structure containing a cavity
    Wherein said cavity contains a gas pocket
    Wherein said gas pocket results in a non-contiguous separation between liquid and at least a portion of said cavity Example Exemplary Sub-Embodiments Wherein said non-contiguous separation inhibits the formation of scalants, foulants, and growths on the solid surfaces in contact with said region occupied by said gas pocket
Wherein a tube with an opening located beneath or inside said concave region is interconnected to a pressurized gas source
Wherein said pressurized gas source may include an air pump, a gas pump, a pressurized gas line, or a combination thereof
Wherein said tube is connected to a valve which allows control over gas entering or exiting said gas pocket through said tube
Wherein at least a portion of the solid surface area in contact with said gas pocket is separated or not in direct contact with water for greater than 30%, or greater than 40%, or greater than 50%, or greater than 60%, or greater than 70%, or greater than 80%, or greater than 90%, or greater than 95% of the time said structure is in said water
Wherein said water comprises a body of liquid
Wherein said gas pocket displaces liquid
Wherein said gas pocket is trapped or stationary in low turbulence or minimal turbulence or non-turbulent conditions
Wherein gas may be pumped into said gas pocket continuously or semi-continuously or on occasion where gas needs to be replenished
Wherein gas is pumped into said gas pocket in excess of the volumetric capacity of said cavity or concave region, resulting in spillover bubbles
Wherein said spillover bubbles reduce fouling on solid surface area not in direct contact with said gas pocket
Wherein said spillover bubbles are methodically dispersed along said solid surface area not in direct contact with said gas pocket using shape modifications to sections of the structure
Wherein said shape modifications may include perforations, dimples, microscopic modifications, surface morphology, or macroscopic modifications
Wherein the height of said structure over the surface of the water can be adjusted by increasing or decreasing the volume of gas in said concave region or cavity
Wherein said concave region or cavity is retrofitted onto a pre-existing structure
Wherein said concave region or cavity is an aspect of the shape of a pre-existing structure
Wherein said concave region or cavity is an aspect of the shape of a new structure
Wherein the shape or size or strength or rigidity of said concave region or cavity may be adjustable
Wherein said adjustability may include controlled forming or collapsing of said concave region or the 'walls' of said concave region
Wherein said adjustability may include controlled forming or collapsing of said concave region or the 'walls' of said concave region using pneumatic or hydraulic means
Wherein said adjustability may include controlled volume or depth or surface area of said concave region
Wherein the volume, or shape, or surface area, or depth of said gas pocket are adjustable
Wherein said gas pocket adjustability involves one or more or a combination of the following: the ability to add or remove gas from said gas pocket, the ability to change the shape or contour of said gas pocket or concave region, the ability to adjust the shape or size of the 'walls' of the concave region
Wherein said gas pocket contains a non-water liquid in addition to or instead of a gas
Wherein the surface of said gas pocket is hydrophobic or contains a hydrophobic coating
Wherein said gas pocket or concave region or cavity may function as a diving bell or temporary shelter or storage region
Wherein said tube is connected to a check valve which allows gas (such as air) to enter said tube and/or said concave region, although does not allow air to be released from said region Prior-Art—Incorporated Herein by Reference Physically Removal of the Barnacles: https://www.scubadubacorp.com/Dockcleaning.htm
Air bubble curtain—air bubbles are sparged over hull: https://www.tandfonline.com/doi/pdf/10.1080/20464177.2009. Ser. No. 11/020,214
https://www.researchgate.net/profile/Sandra_Shumway/publication/44684741 The use of aeration as a simple and environmentally sound means to prevent biofouling/links/Oc96051ffe80269766000000.pdf
https://patents.google.com/patent/US20050087117A1/en Figure Key '1' or '(1)': Top section of a floating platform or dock
'2' or '(2)': Floats or pontoons, bottom section of a floating platform or dock
'3' or '(3)': Gas or air pocket, which may be in the concave region on the underside or bottom of '2'
'4' or '(4)': Liquid body, such as a body of water or oil
'5' or '(5)': Extended walls, which may extend beyond the vertical depth of the air pocket
'6' or '(6)': Air or gas bubble curtain up the side walls of '2' in contact with water. '6' may result from gas being pumped into a concave region, and the gas pocket exceeding the volume of the concave region's gas capacity. The bubble curtain may be facilitated by perforations or dimples in the side walls. A bubble curtain may reduce growth formation on surfaces not in contact with the gas pocket.
'7' or '(7)': Air or gas pump connected to tubing (lines with arrows). Tubing may interconnect said gas or air pumped by said pump with the concave region.

FIG. 1: An example dock with a concave region 'gas pocket' ('3') on the bottom of each float or pontoon. The gas pocket may enable a large portion of the surface area on the bottom of the dock, or the surface area of the dock in contact with the air pocket, to have minimal or no levels of foulants, scalants, or growths.

Figure 2:
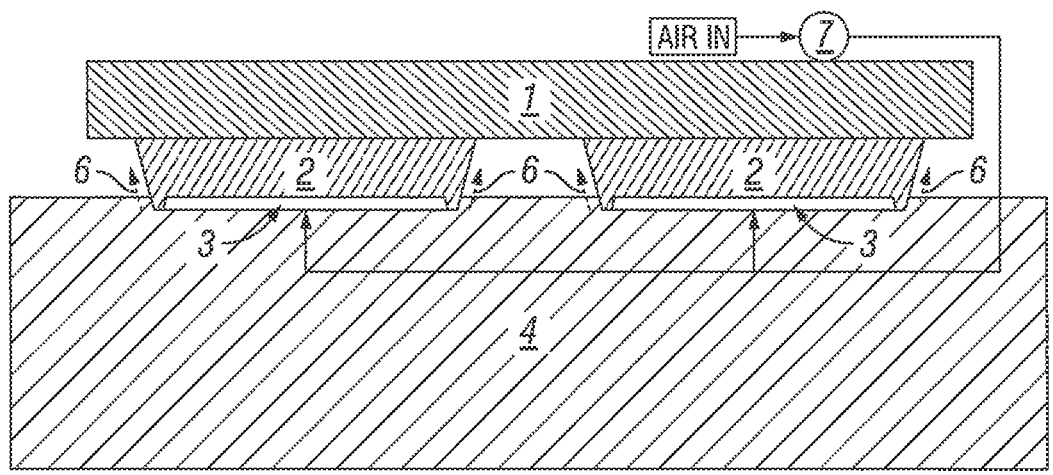
FIG. 2 (above): An example dock with a concave region 'gas pocket' ('3') on the bottom of each float or pontoon with air pump and tube interconnected.

FIG. 2: An example dock with a concave region 'gas pocket' ('3') on the bottom of each float or pontoon. A tube may be placed beneath or connected to bottom of dock. Air or other gas may be pumped into the tube, which directs gas into the gas pocket. If the volume of gas exceeds the volume of the concave region or cavity, bubbles may travel up side of dock, which may, if desired, form a bubble curtain along the side of the dock ('6'). Said bubbled curtain may be facilitated, for example, by placing dimples or perforations in the 'walls' of concave region. Dimples or perforations may be located near the bottom of the vertical depth of said 'walls' of the concave region. Said bubble curtain may be desirable to minimize fouling, scaling, and growths outside of the gas pocket. If a continuous bubble curtain is desirable, a continuous flow of pumped air may be required.

Figure 3:
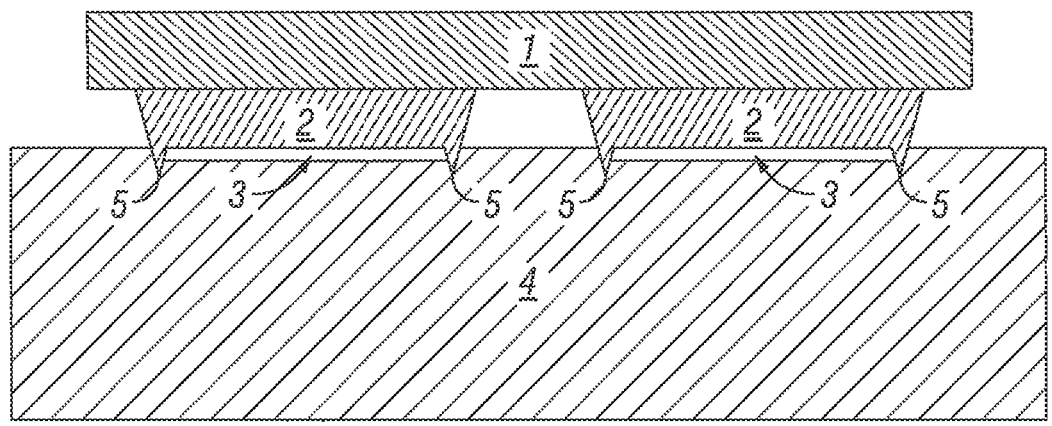
FIG. 3: An example embodiment with extended 'walls', which may be employed to prevent air or gas losses in the event of, for example, waves, turbulent water, or a significant change in the angle of the dock.

FIG. 3: An example embodiment with extended 'walls', which may be employed to prevent air or gas losses in the event of, for example, waves, turbulent water, or a significant change in the angle of the dock. Extended walls may extend to a depth beyond the depth of the air pocket. Extended walls may be weighted, if desired, to reduce center of gravity. It may be desirable to prevent the air pocket from extending to the full depth of the extended walls (for example: to ensure the dock is stable), in which case it may be desirable to include small perforations in certain parts of the extended walls. Air or other gas may need to be pumped into the air pocket less frequently or on fewer occasions in embodiments with extended walls.

Figure 4:
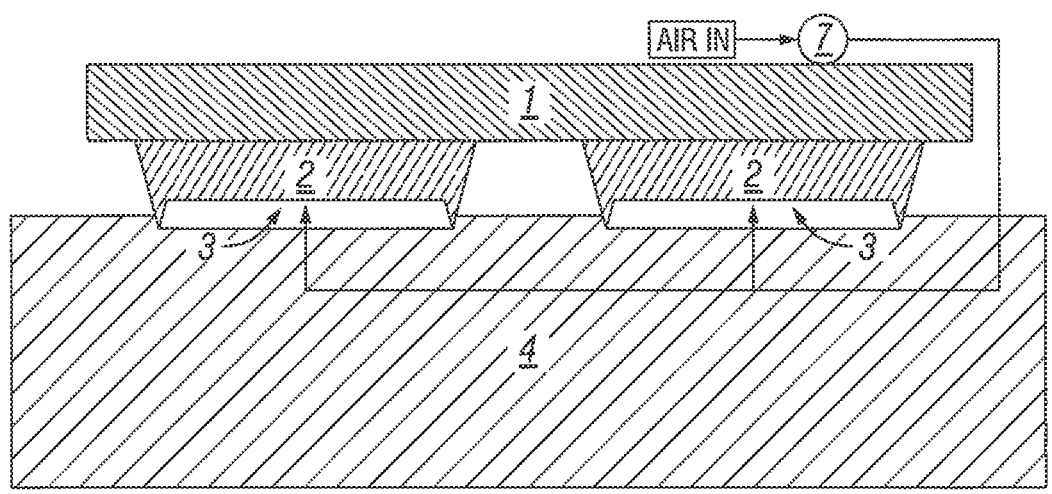
FIG. 4: An example embodiment where changing the volume of gas in a gas pocket adjusts the height above the liquid surface and/or angle of a floating structure, such as a dock.

FIG. 4: An example embodiment where changing the volume of gas in a gas pocket adjusts the height above the liquid surface and/or angle of a floating structure, such as a dock. FIG. 4 may show the height of a dock above the surface of water being increased by pumping air into two concave regions, increasing the volume of an air pocket and displacing water from the concave regions. The present embodiment may be advantageous for increasing or decreasing the height or reducing the draft of a dock. Advantageously, relatively little energy may be required to increase the height of the dock due to, for example, the potentially low air pressure in the concave region due to, for example, the relatively small head height. Advantageously, no moving parts are required to be in contact with the liquid.

Figure 5:
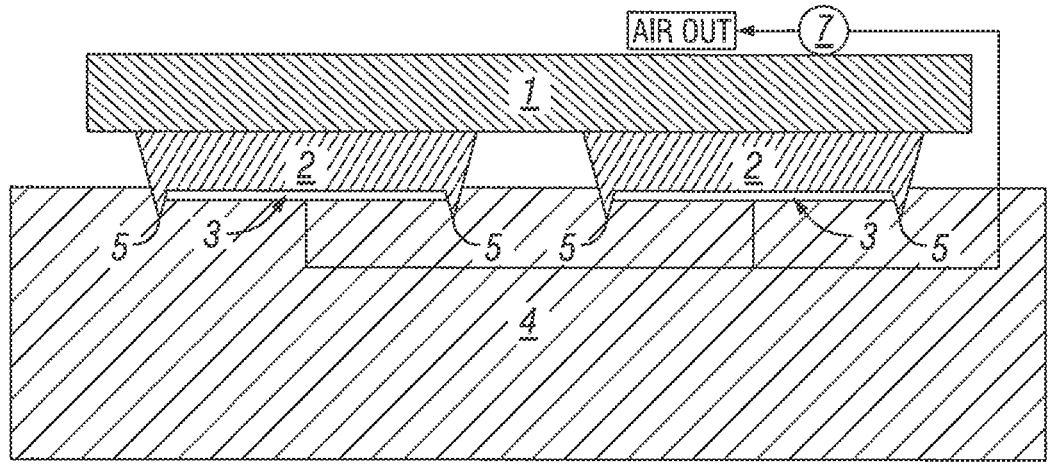
FIG. 5: An example embodiment where changing the volume of gas in a gas pocket adjusts the height above the liquid surface and/or angle of a floating structure, such as a dock.

FIG. 5: An example embodiment where changing the volume of gas in a gas pocket adjusts the height above the liquid surface and/or angle of a floating structure, such as a dock. FIG. 5 may show the height of a dock above the surface of water being decreased by releasing air from concave regions, increasing the volume of an air pocket and displacing water from the concave regions. The present embodiment may be advantageous for increasing or decreasing the height or reducing the draft of a dock.

Second Description of Embodiments

Example Energy Storage Embodiments Overview:

Introduced are systems, and methods for energy storage and/or simultaneous oil or chemical storage. In some embodiments, energy is stored via a hydrostatic pressure difference between one or more insoluble or low solubility fluids, which may be driven by a density difference between the one or more fluids. The technology may employ the depth of water bodies to, for example, enable this hydrostatic pressure. An embodiment may comprise, for example, a relatively high density liquid, and a relatively low density liquid or fluid, which may have a lower density than the relatively high density liquid. The end-to-end technology may be a closed system or may be at least closed beneath the surface of the water body. In some embodiments, all or almost all moving parts above the surface of the water body, such as ocean or lake, or, advantageously, not have moving parts, or not have essential moving parts or not have relatively costly moving parts, under water or deep under water, or no moving parts at a depth greater than 250 ft under water, or no moving parts at a depth greater than 1000 ft under water. It may be beneficial for the system to be a closed system, wherein the internal fluids, for example high density and low density liquids, are in direct contact with each other. The internal fluids may be separate from or substantially not in contact with the surrounding water body. The water in the water body may simply be employed to ensure pressure, for example liquid pressure, is in equilibrium between the inside fluids and surrounding or external water body. An equilibrium in pressure between the outside and inside of the vessel may enable, for example, the use of lower cost materials, as, for example, at least a portion of the materials may not require resistance to pressure differences or substantial differences. Energy may be stored in the hydrostatic pressure difference between the media (for example: liquids) inside the vessel, for example, wherein one or more media have a higher hydrostatic pressure than another one or more media. Difference in hydrostatic pressure may be driven by the difference in hydrostatic pressure of liquids of difference densities at the same hydraulic head height. An embodiment may comprise media comprising two or more immiscible or low solubility liquids with different densities. The difference in density between two or more liquids at the same or similar height may drive the hydrostatic pressure difference. Advantageously, the process may operate with greater than 70% or 80% round-trip efficiency due to the incompressibility of liquids and high efficiency of hydroelectric generators.

Embodiments may employ liquids, solids, gases, supercritical fluids or other media phases. One or more phases may be advantageously employed, for example, because said integrated system may be a closed system. For example, in a closed system, contamination with the surrounding water body may not be a challenge, unless, for example, there is a leak.

In one embodiment, liquid storage of a higher density liquid (such as water) and liquid storage of a lower density liquid (such butane) are placed at a relatively higher head height than a separate liquid-liquid interface vessel or vessels. Said relatively higher head height may be including, but not limited to, one or more of a combination thereof: located lesser depth in the surface of a water body, at the surface of a water body, above the surface of a water body, floating on the surface of a water body, located on land adjacent to a water body, or located on another water body, or located on land. It may be desirable for the higher density liquid to have the same or similar density as the surrounding water body at the same depth. For example, if the pipe or container containing the high density and low density liquids are in ocean, the higher density liquid may comprise a liquid of the same or similar or relatively close density as the surrounding water body or other surrounding media. Alternatively, the higher density liquid may significantly differ in density from the surrounding water body or other surrounding media, as in such an embodiment, pressure difference resistant materials may be required. Separate liquid-liquid interface storage vessel or vessels may be located at a lower head height than the liquid storage. Said liquid-liquid interface storage vessel or vessels may be connected to the higher head height liquid storage vessel or vessels using one or more tubes. Tubes may be employed to transport the lower density liquid or the higher density liquid or a combination thereof. One or more tubes may be connected to one or more valves or pumps or sealed connecting joints. For example, the lower density liquid may be connected to liquid tube or tubes, which may be connected to one or more pumps or generators or connected to low density liquid storage or a combination thereof. For example, the higher density liquid may be connected to liquid tube or tubes, which may be connected to one or more pumps or generators or connected to higher density liquid storage or a combination thereof.

Storing energy may involve, for example, pumping the lower density liquid into a tube or tubes, displacing at least a portion of the higher density liquid out of the tube or tubes and underwater vessel or vessels into the higher density liquid storage or, alternatively, displacing the higher density liquid into the surrounding water body. Energy may be stored energy due to the difference in hydrostatic pressure between the low-density liquid and high density liquid at the same hydraulic head height—for example, as the low density is pumped into the tubing or storage vessel, it is overcoming the hydrostatic pressure of the higher density liquid, developing a hydraulic head. When the storage device stops charging, a valve may be employed to prevent the one or more liquids from undesirably reversing flow direction.

A check valve may be employed during pumping operation to prevent the low-density liquid from reversing pumping direction. Energy storage time-period may indefinite if there are no leaks. During discharge, one or more valves may open, enabling the pressurized low-density liquid to be at least partially displaced and enable said low density liquid to power a generator. Valves, pumps, generators, and other moving parts may be located at the surface or just below the surface, or on land, or a combination thereof as this may reduce capital, operational, and/or maintenance costs.

In another embodiment, the process may be an open system, wherein the higher density fluid is comprises the fluid in one or more liquid or water bodies, such as, for example, water or salt water or oil or relatively inexpensive liquid. For charging, the low density liquid may be pumped into one or more vessels, displacing the higher density water or liquid in the vessel. The process may contaminate the water in the bay, although this may be minimized by, including, but not limited to, minimizing mixing, preventing the contaminant liquid level, for example the low density liquid level, from approaching or surpassing the edge of the vessel, using a low solubility or insoluble combination of liquids or media, using a non-hazardous or inexpensive low density liquid, or a combination thereof. In the present embodiment, a high density liquid storage vessel may be unnecessary, potentially reducing capital cost and complexity. A version of the present embodiment may comprise an upside down barrel with a tube opening on the inside of the closed, upward facing side of the barrel and a port open to the surrounding liquid body (for example, water body or ocean or lake) on the bottom facing side of the barrel. A version of the present embodiment may comprise an upside down barrel with a tube connected to a liquid tight port connected to upward facing side of the barrel and a port open to the surrounding liquid body (for example, water body or ocean or lake) on the bottom facing side of the barrel. A version of the present embodiment may not contain any liquid tight ports—a tube may be fed into the open side of the up-side-down vessel or barrel and attached to the bottom (inside of top of barrel because up-side-down) of the inside of the vessel or barrel. Advantages of said alternative embodiment include, but are not limited to, a simplified construction, higher pressure resistance, lower opportunity for leak or contamination, and low cost. One or more vessels or barrels may be further connected to a weight or anchor and the upper region of the barrel may be connected to floatation to maintain the one or more vessels or barrels in the desired position (for example, the upside-down position). One or more tubes may be further connected to a pump or generator, which may be further, connected to one or more low density fluid storage vessels. Said one or more lower density liquids (or other fluid, such as a gas) storage vessels may be located at a higher head height, for example, near the surface, at the surface, or above the surface of the water body. During charging, the lower density liquid (or other fluid, such as a gas) may be pumped into the vessel, displacing the higher density liquid. During discharging, low density liquid may be pumped into the vessel, displacing the higher density liquid.

Pressure of Low Density Liquid:

The pressure of the low density liquid when the liquid is forced to displace higher density liquid, as is the case when energy is stored, may be at a higher pressure than the surrounding water body, wherein the pressure difference between the low density liquid and the surrounding water body increases with decreasing depth. At the interface between the lower and higher density liquids, the pressure of the two liquids may be equal or close to equal. As the depth of the lower density liquid decreases (or the higher the low density liquid is above the liquid-liquid interface), the greater the lower density liquid deviates in pressure from the higher density liquid or the greater the net pressure of the low density liquid. As a result, the tube or other vessel transporting the lower density liquid across depths or head heights may require pressure resistance, the pressure resistance requirement may increase with decreasing depth (or greater hydraulic height from the liquid-liquid interface or deepest point). The point of the pump or generation may comprise the highest pressure in the embodiment. One way of describing this phenomenon is:

If an open tube is placed vertically in a water body, the water inside the tube, although separated, is predominately at the same pressure as the surrounding water body at any given depth because the water pressure applied by the water inside the tube above a given point in the tube is the same as the water surrounding the tube. Similarly, when a liquid of different density, such as a lower or higher density, is placed in a closed bottom vessel in open air, the pressure of the liquid at any given point may be equivalent to the liquid pressure applied by the liquid above a point in the liquid. At the same height or depth, a liquid of lower density may have a significantly lower gravitationally derived pressure than a liquid of higher density. When a lower density liquid is displacing a higher density liquid (for example, due to the application of an outside force) in a location experiencing gravity, the net pressure or pressure difference experienced by the lower density liquid at any given height above the liquid-liquid interface or deepest point of the low density liquid is:

$$P_{Net} = P_{HD} - P_{LD}$$

Figure 6:
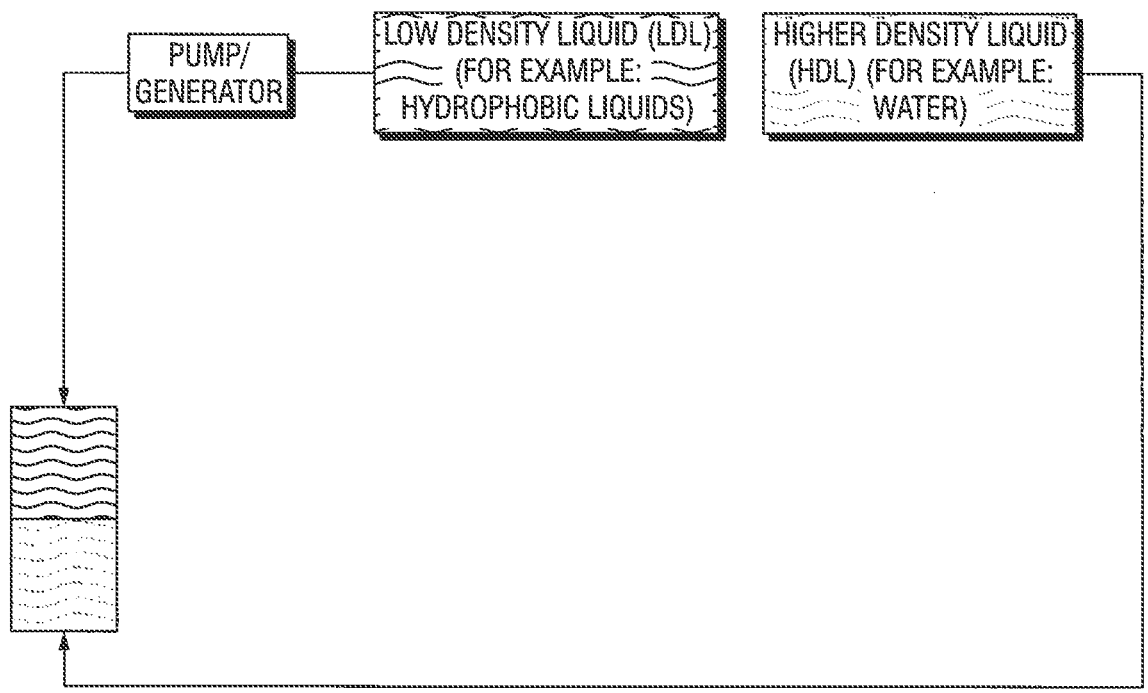
FIG. 6: An example simplified setup of an embodiment employing a lower density liquid and a higher density liquid.

Wherein:
'$P_{Net}$' may be the Net Pressure of Lower Density Liquid at a Given Height above the Lowest Depth of the Lower Density Liquid or Liquid-Liquid Interface
'$P_{HD}$' may be the Gravitational Pressure Head of Higher Density Liquid at the Height Above Lowest Depth of Low Density Liquid or Liquid-Liquid Interface
'$P_{LD}$' may be the Gravitational Pressure Head of Lower Density Liquid at Height Above Lowest Depth of Low Density Liquid or Liquid-Liquid Interface FIG. 6: FIG. 6 shows a simplified setup of an embodiment employing a lower density liquid and a higher density liquid. The two boxes with black text are the higher head height liquid storage vessels. The higher head height liquid storage region is connected via tubes or pipes to one or more separate storage vessels. In FIG. 6, the tubes are connected to a single storage vessel at a head height below the surface of the liquid body (such as a water body) and located at a head height below the higher head height liquid storage vessels, which may be referred to as the lower head height storage vessel. The higher density liquid tube or pipe is connected to one or more ports at the bottom of the lower head height storage vessel. The lower density liquid tube or pipe is connected to one or more ports at the top of the lower head height storage vessel. It is important to note the location of placement of ports on the lower head height storage vessel may not be of importance, and ports may be placed, in, including, but not limited to: next to each other, across from each other vertically, across from each other horizontally, placed randomly, or in another configuration or in a combination thereof. It may be important for the ports to be liquid tight. An exception may be, for example, if the heavy liquid port is open to the surrounding water bay, potentially eliminating the need for a liquid tight port for the higher density liquid and potentially eliminating the need for a high density liquid pipe or storage vessel. The region inside the lower head height vessel where the higher density liquid and lower density liquid meet may be referred to as the fluid-fluid or liquid-liquid interface. The liquids may be contacted directly, in which case it may be desirable for the liquids to be immiscible. The liquids may also be spaced or separated or constitute non-contiguous liquids by a separator or drum, including, but not limited to, a drum or floating drum. If a floating drum is employed to separate the higher density liquid from the lower density liquid, it may be desirable for the floating drum to be of lower density than the higher density liquid and higher density than the lower density liquid. A liquid-liquid separator or drum may be employed, for example, to reduce liquid-liquid mixing (especially important for soluble liquids) or, in the case where open water is the high density liquid higher density liquid, reduce environmental contamination. Energy is storage by pumping the lower density liquid into the lower density liquid tube or pipe, which may displace the higher density liquid from the lower head height storage vessel. Stored energy may be released by enabling the displaced water to enter the lower head height vessel, which may displace the lower head height liquid and generate electricity. In the configuration shown in FIG. 1, the pump/generator is shown connected to the lower density liquid pipe or tube, which may enable higher pumping efficiency. Pump may be above the water surface, enabling no moving parts to be under water. The lower density liquid may be under pressure during charging and discharging.

A pump/generator may be connected to the higher density liquid. One potential challenge of pumping the higher density liquid directly is charging may require the formation of a partial vacuum, which may be less efficient and, even in the case of a pure vacuum, may not be enough driving force to remove sufficient higher density liquid from the lower head height vessel. It may be desirable for the pump or generator to be beneath the water line, for example, if the pump or generator is directly in contact or pumping the higher density liquid.

Liquid storage regions may comprise tanks or reservoirs storing the lower density liquid or higher density liquid. Substantially immiscible or insoluble may mean a liquid which is less than 50 weight percent (wt %), or less than 40 wt %, or less than 30 wt %, or less than 20 w % soluble in the other liquid.

It may be advantageous for the higher density liquid storage region to be beneath the water line or at the same or similar or lower depth than the liquid-liquid interface or lowest point of the lower density liquid. This may be advantageous, for example, if the higher density liquid has the same density as the liquid body, such as water body, surrounding the energy storage device. The higher density liquid storage region may comprise, for example, a bladder-like storage device in pressure equilibrium with the surrounding liquid body, such as water body. The higher density liquid storage region may comprise, for example, a storage device with a floating or movable roof in pressure equilibrium with the surrounding liquid body, such as water body.

The lower head height vessel may be pressure difference resistant. The pressure resistance required by the lower head height vessel may increase with vertical distance from the liquid-liquid interface or lowest point of the lower density liquid. It may be advantageous to minimize the vertical height of the vessel, minimizing the pressure difference experienced by the lower head height vessel compared. This may transition more or most of the lower density liquid pressure difference to the pipe/tube. It may be advantageous to progressively increase the reinforcement of the lower head height vessel with increasing vertical distance from the liquid-liquid interface or the lowest point of the lower density liquid. For example, the structure of progressively increasing the reinforcement of the lower head height vessel may be similar to water towers, wherein the vessel is progressively more pressurize resistant and reinforced with higher hydrostatic pressure.

The higher density liquid storage and lower density liquid storage may be, for example, located beneath the surface, floating on the surface, or on land. In some embodiments, the higher density liquid storage may comprise the surrounding water body. In some embodiments, the higher density liquid storage may be in a different location than the lower density liquid storage. For example, the higher density liquid storage may be a bladder like expandable and contractible volume storage region beneath the water body surface, while the lower density liquid storage region may be located on land.

The energy storage device may undergo charging or discharging at any point in storage capacity. For example, if the device is at least a portion charged, it may be discharged. For example, if the device is at least a portion discharged, it may be charged. For example, if the device is fully charged, it may not have the capacity to further charge. For example, if the device is fully discharged, it may not have the capacity to further discharge.

Figure 7:
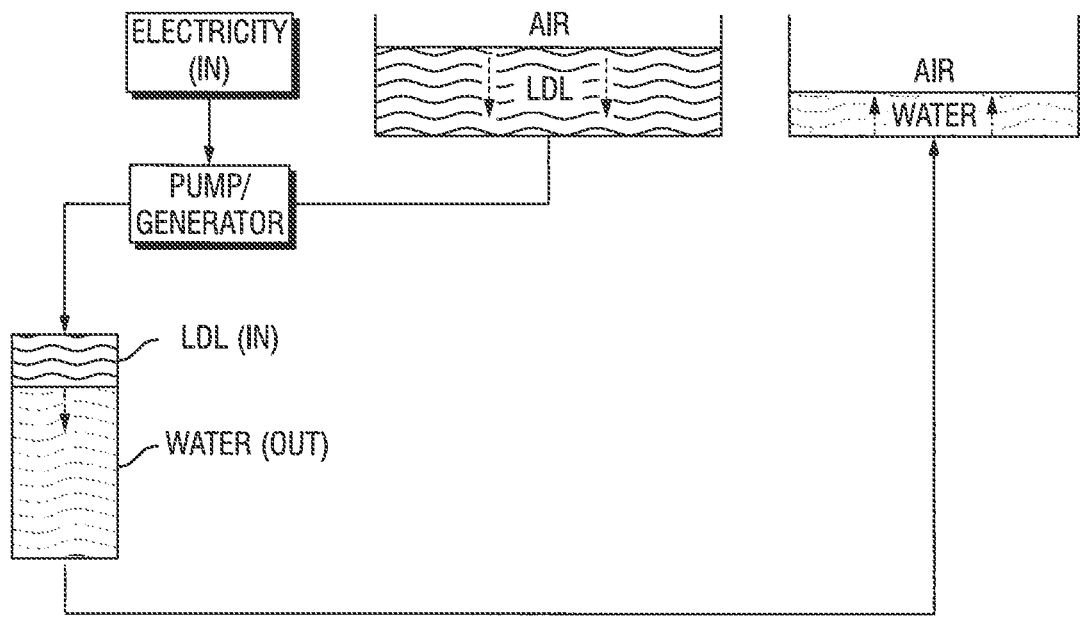
FIG. 7: Step 1.

Example Step by Step Description:

FIG. 7: Step 1: FIG. 7 may show an energy storage device undergoing charging. A liquid pump may pressurize and pump the Lower Density Liquid (LDL) into a pipe connected to the lower head height storage region, which may allow the LDL to displace the higher density liquid (HDL) in the lower head height storage. As HDL is displaced by the LDL, gravitation potential energy may be stored. In FIG. 7, HDL may be shown being transferred it to an HDL storage region above the lower head height storage region. The HDL storage region, for example, if it comprises a fluid in equilibrium with the hydrostatic pressure of the surrounding liquid or of the same density as the surround liquid, may be located elsewhere, for example, beneath the surface of the liquid body, or at the same height or depth as the lower head region, or below the depth of the liquid-liquid interface. The pump or pumps may be powered by work, for example, electricity, hydraulic pressure, or mechanical work.

The LDL may a volatile liquid (such as propane or butane) and the LDL storage region may be closed. Regardless of whether the LDL is volatile, the LDL storage region may be closed to outside air. If the LDL is sufficiently volatile, the headspace gases in the LDL may comprise the LDL in the gas phase. If the LDL has a sufficiently high partial pressure (for example: propane or butane), the LDL storage region may be pressure resistant and comply with the appropriate safety precautions.

The HDL may be a volatile liquid. The HDL may comprise water. It may be desirable for the HDL storage region to not be open outside air, as biofouling agents and other contaminants may enter. Alternatively, the headspace of the HDL storage region may comprise, for example, filtered or treated air.

Figure 8:
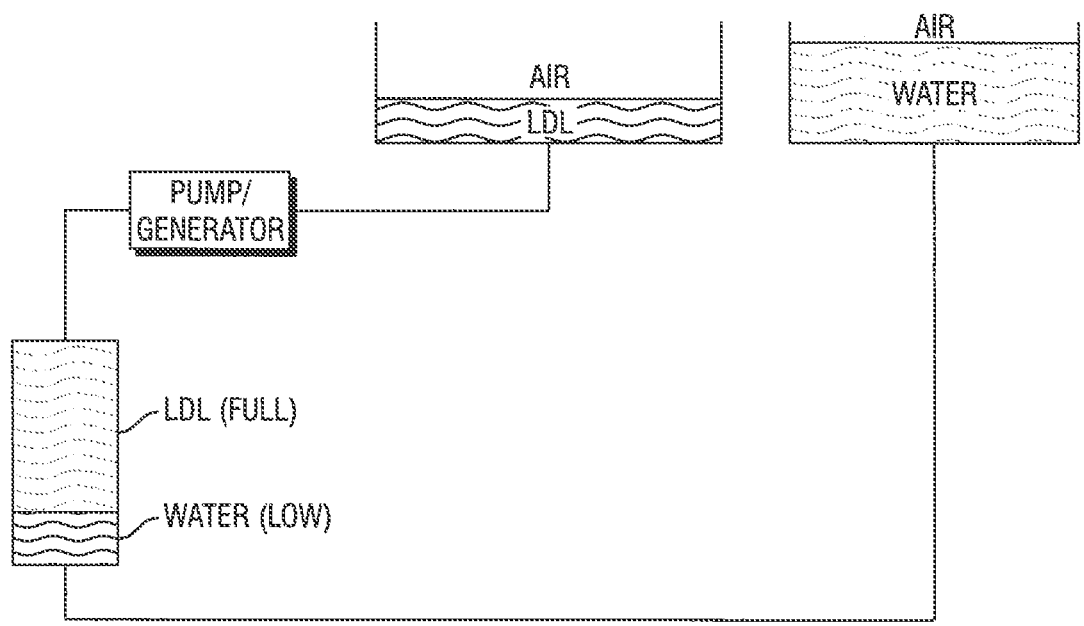
FIG. 8: Step 2.

FIG. 8: Step 2: FIG. 8 may show an energy storage device at a relatively charged state. At a charged, or discharge, or when charged, or when at a steady state, a check valve may be employed to prevent liquid from flowing into the LDL tank.

It may not be advantageous to have LDL enter the higher density liquid region, which may occur, for example, during overcharging if the HDL storage region is located at a higher height relative to the LDL. If this were to occur, for example, the LDL may float to the surface of the HDL storage region if the HDL storage region is at a higher height relative to the LDL liquid-liquid interface. This may be remediated, for example, by removing the LDL from the HDL using, for example, one or more or a combination of the following: decanting, cyclone, coalescer, filter, or other means of phase or liquid-liquid separations. If the LDL forms a gas phase at the conditions in the HDL storage region, the LDL may be separated by, for example, including, but not limited to, one or more or a combination of the following: removing LDL gas from the headspace, compression of headspace gases, cooling headspace gases, gas separation methods, pressure swing adsorption, pressure swing absorption, membrane, distillation, combustion, absorption, or adsorption.

Figure 9:
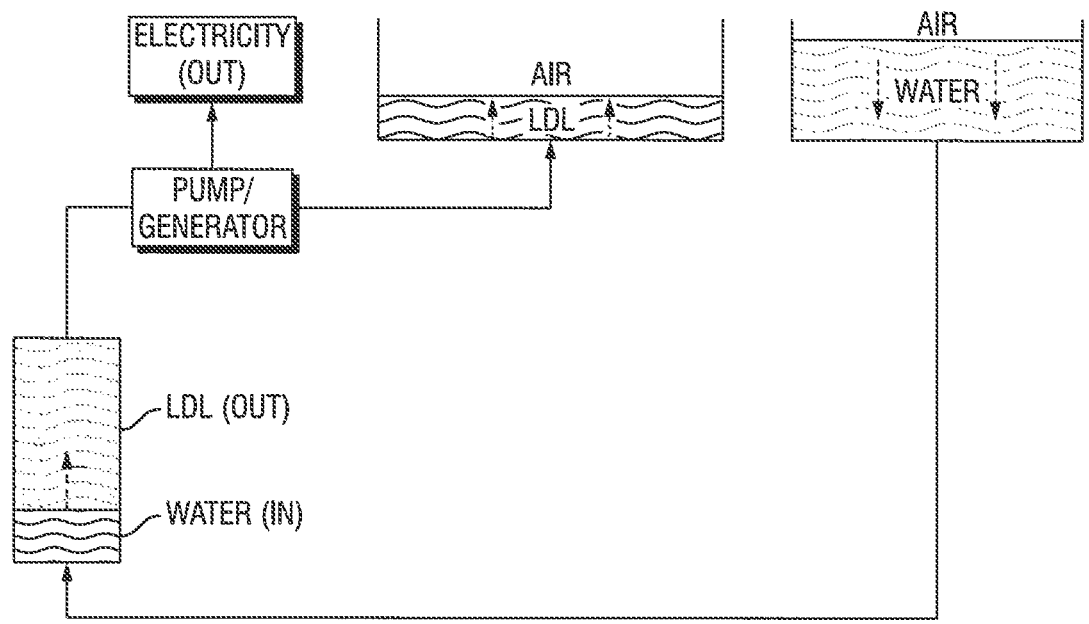
FIG. 9: Step 3.

FIG. 9: Step 3: FIG. 9 may show an energy storage device discharging. HDL may displace LDL in the subsurface storage region, which may result in high pressure LDL passing through a generator, generating electricity, and entering, for example, an LDL storage tank.

Figure 10:
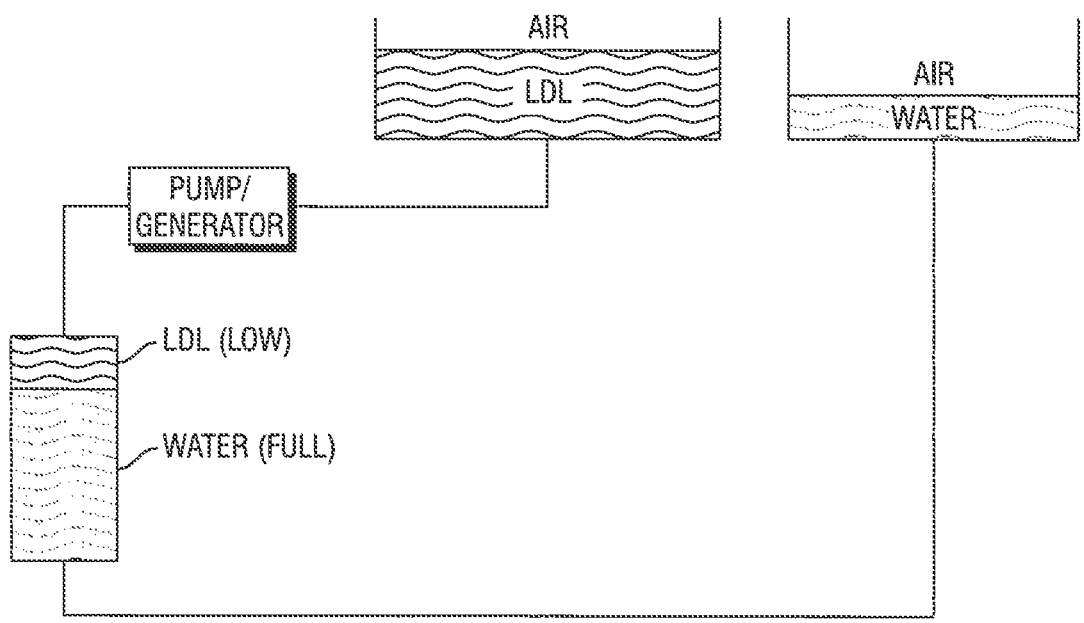
FIG. 10: Step 4.

FIG. 10: Step 4: FIG. 10 may show an energy storage device at a relatively discharged state. At a discharged or charged or when charged or when at a steady state, a check valve may be employed to prevent liquid from flowing into the LDL tank.

Figure 11:
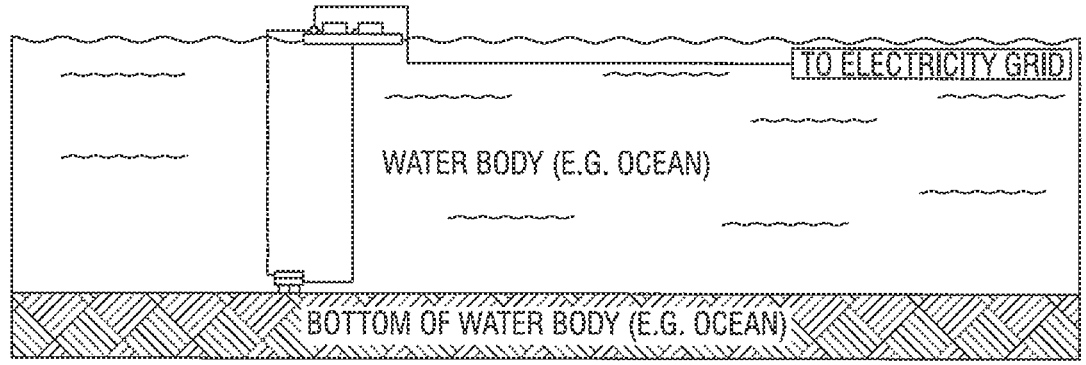
FIG. 11.

FIG. 11: FIG. 11 may show an example embodiment where the LDL and/or HDL storage regions at a higher head height or above the surface are located on a platform or a floating platform. If desired, the only direct interconnected between the energy storage device and land may be a medium for transporting electricity, such as an electric cable.

Figure 12:
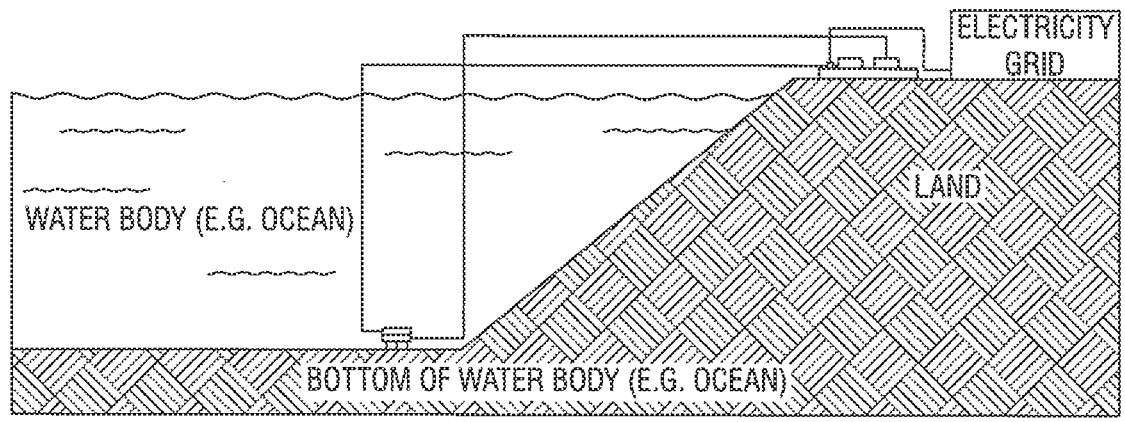
FIG. 12.

FIG. 12: FIG. 12 may show an example embodiment where the LDL and/or HDL storage regions at a higher head height or above the surface are located on land, such as on the shore or on an island.

Figure 13:
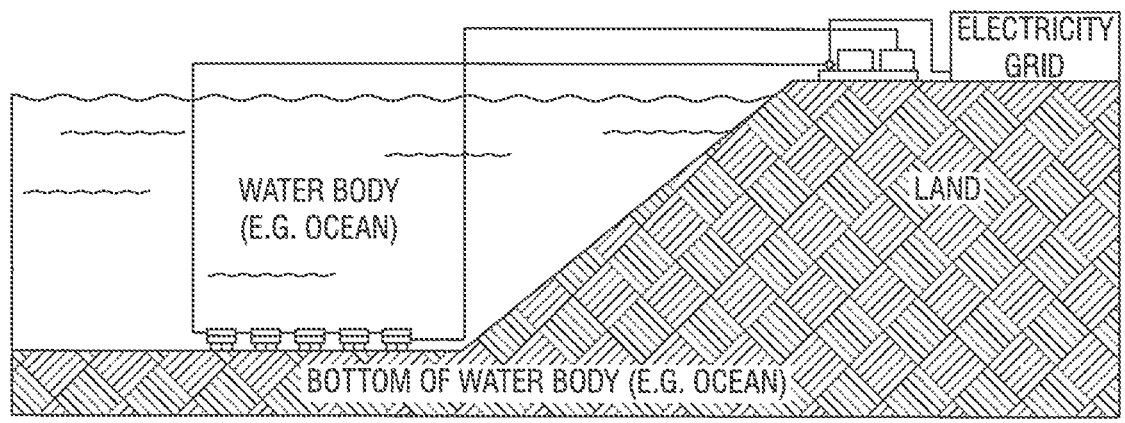
FIG. 13.

FIG. 13: FIG. 13 may show an example embodiment where multiple subsurface storage regions are employed for energy storage. If there is more than one subsurface storage region, the subsurface storage regions may be interconnected, which may minimize the number of pipes between the higher head height storage region or regions and the lower head height or subsurface storage region or regions.

Example Installation of an Example Embodiment

1. Connect tubes (lower density liquid tube and higher density liquid tube) to the two ports of a liquid-tight vessel. Tubes may be wrapped in a roll or in another storage configuration.
   a. The location of the ports may be of importance, and may be located, for example, to minimize mixing. For example, ports may be located near the top of the vessel for the low-density liquid tube connection and near the bottom of the vessel for the higher density liquid tube.
   b. Tubes may be connected to one or more rolls of tubing
   c. Tubes or vessels may require withstanding pressure, although in some embodiments only the tube transporting the lower density liquid must withstand substantial pressure differences.
2. Fill the vessel or tubes or both with a liquid at the same or similar density as surrounding water body (for example: if ocean, same density as ocean water, may be salt water or an aqueous solution containing a dense organic additive, such as glycerol or ethylene glycol or propylene glycol. It may be desirable for the liquid to not comprise bio-foulants, scaling agents, or corrosion or degradation causing agents). Alternatively, the liquid may comprise bio-foulants, scaling agents, or corrosion or degradation causing agents, for example raw ocean water or lake water or raw oil storage liquid or raw waste water or other liquid. The liquid filling the vessel or tubes or both in the present step may be considered the higher density liquid.

3. Attach tubes to their desired storage tank and generator/pump
4. To ensure the vessel remains in the desired position (for example, such as upright) and prevent tangling of tubes, the implementation may involve attaching one or more weights or anchors to near the bottom of the vessel and one or more buoyant floats to near the top of the vessel. The float or near top of the vessel or combination thereof may be further attached to a line, which may be connected by a connector comprising a detachable mechanism, such as clip, or remotely detachable clip.
5. Allow vessel to sink to a desirable depth, for example, near or at the bottom of a water body. Unravel the tubes and lines (for example: the float line and guide line) as the vessel sinks.
6. When the vessel reaches its desired depth (for example: the depth at which the weight or anchor reaches the bottom) the guide line may be detached or may be attached to a float specifying the location.
7. To charge, pump low density liquid into the liquid tubes or vessels, displacing the higher density liquid, which travels through an adjacent tube into a storage vessel. During charging, the low-density liquid may displace the higher density liquid in the tube or in the vessel or in a combination thereof.
8. To discharge, open valve, allowing pressurized low-density liquid (for example: from step 8) to the generator (which may be, for example, a separate generator or may be a pump that can reversibly be used as a generator).

Potential Benefits of Energy Storage Technology Described Herein:
>80% round trip efficiency
Liquid pump and generator achieves high efficiency and low thermodynamic losses
Unlimited available land area (sits at bottom of water body or ocean)
Unlimited storage time
Unlimited charge/discharge cycles
No moving parts in ocean
No degradation or corrosion
Reagents do not contact with ocean (water body, such as ocean, is simply used to create depth/head height with same surrounding hydrostatic pressure)
Unaffected by marine or water body growths (e.g. barnacles, slimes)
Entirely closed system
Cost per kWh—Butane costs ~$300 per m$^3$ liquid
Energy density (at 1000 m-1 m$^3$ of butane-water is about 1 kWh of electricity)
No environmental impact
Closed system
Non-toxic reagents (if a leak were to occur)
Abundant, Non-toxic, Non-volatile reagents and building materials
Simple, low cost construction
Hydrostatic pressure inside technology may be the same as its surroundings. Enables use of low cost, less pressure resistant materials in construction. (Note: Tube connected to low density liquid may require higher pressure resistance)
No moving parts in water
Embodiment may comprise three tanks (two on surface, one on ocean floor), two pipes and one pump/generator It may be desirable for the high density liquid (HDL) to have the same density as the surrounding water body liquid. This may enable similar hydrostatic pressure inside the vessel(s) and/or pipes as surrounding the vessel(s) and/or pipes, enabling the potential use of lower cost, less pressure resistant materials.

To maximize the energy density of the introduced storage device, potentially desirable characteristics, include, but are not limited to, large net density difference (i.e. [density of high density liquid]−[density of 'low density liquid']) and low pressure or temperature driven liquid compression (e.g. water minimally compresses under high pressure). An example of this includes, but is not limited to, propane (LDL) and water (HDL)

To enable effective functionality of the introduced storage device, potentially desirable characteristics, include, but are not limited to, two or more reagents that are substantially insoluble or immiscible. It may be desirable for the high density liquid and low density liquid to be substantially insoluble or immiscible in each other.

To minimize capital cost, potentially desirable characteristics, include, but are not limited to, low cost reagents, low density for low density liquid, and/or low corrosion or non-corrosive reagents. For example, butane and propane are low cost and liquid at higher pressure operation.

To minimize capital cost, potentially desirable characteristics, include, but are not limited to, employing materials that are compatible with the reagents inside the integrated process. For example, polypropylene or HDPE is inexpensive, abundant, corrosion resistant, and compatible with water, seawater, butane and propane.

The energy storage device may also be a means of storing hydrocarbon liquids or chemicals or volatile hydrocarbons. For example, the LDL storage region and lower head height storage region may comprise storage for hydrocarbons, such as, for example, including, but not limited to, crude oil, gasoline, diesel, kerosene, ethane, propane, butane, hexane, octane, cyclopropane, or decane, or a combination thereof. Hydrocarbon liquids are stored in small, medium, or large quantities before they are used or transported in various applications, such as polymer production, fuel, or other uses. By employing the energy storage device as a simultaneous relatively low density liquid storage device, the capital expense of the hydrocarbon liquids may be avoided. For example, oil & gas companies, hydrocarbon transport companies, oil traders, commodity traders, chemical companies, and other users of hydrocarbons or other relatively low density liquids may employ the present energy storage device as a hydrocarbon liquid storage device. For example, the owners or operators of the energy storage device may be compensated for the storage or service or storing the relatively low density liquids. Although the relatively low density liquids may be purchased, in the present embodiment, the relatively low density liquids may advantageously not be purchased by the owner or operator of the energy storage device. Alternatively, the owner or operator of the energy storage device may be compensated for properly storing the relatively low density liquids. This may eliminate the need to pay the capital expense of purchasing the hydrocarbon liquids, while also developing a new revenue source for storing the hydrocarbon liquids.

High density liquid may comprise a higher density liquid with limited solubility in water, such as propylene carbonate (density of ~1.2 g/cm3) or ethylene glycol diacetate (density of ~1.128 g/cm3). With said higher density liquid with limited solubility in water, water may be employed as a low density liquid. Said higher density liquids may be low cost, non-volatile, and relatively non-toxic, enabling their use in large volumes in aquatic or marine environments. Aquatic and marine are used interchangeably herein.

Ridged storage regions or containers may be employed for the storage region or regions located beneath the surface of the water. Said storage regions may include, but are not limited to, storage containers presently employed to store crude oil or chemicals beneath the surface of the ocean or other water body. Storage regions, including non-ridged or ridged storage regions or containers, may be located outside the water or liquid body. Alternatively or additionally, the storage regions may be located in strategic oil reserves, oil storage, natural gas storage, liquids storage, saline aquifers, geological formations, or oil & gas wells. It may be desirable for one or more storage regions experiencing greater than atmospheric pressure hydrostatic pressure to be in an environment where the surroundings exert a similar or supplemental pressure to minimize the strength requirements and potential cost of a storage region or container. In the case of a solid surroundings, such as a geological formation, such as a salt cavern, the geological formation or artificially constructed geological formation may function to contain or store said liquids directly and may function as a storage region on its own.

Example Exemplary Embodiments

An energy storage device comprising:
  Two or more storage regions
    Wherein at least one storage region is at a greater pressure than another storage region
    Wherein energy is stored using the difference in pressure between a lower density liquid and a higher density liquid at the same head height or depth
An energy storage device comprising:
  Two or more storage regions
    Wherein at least one storage region is at a greater pressure than another storage region
    Wherein said energy storage device is charged by pumping a relatively low density liquid into a storage region to displace a relatively higher density liquid
    Wherein said energy storage device is discharged by allowing a relatively higher density liquid to displace a relatively lower density liquid and allowing the flow of said lower density liquid to power a generator or hydraulic turbine
A subsea oil or chemicals storage facility which simultaneously functions as a large-scale energy storage device comprising:
  Two or more storage regions
    Wherein at least one storage region is at a greater pressure than another storage region
    Wherein energy is stored using the difference in pressure between a lower density liquid and a higher density liquid at the same head height or depth
A subsea oil or chemicals storage facility which simultaneously functions as a large-scale energy storage device comprising:
  Two or more storage regions
    Wherein at least one storage region is at a greater pressure than another storage region
    Wherein said energy storage device is charged by pumping a relatively low density liquid into a storage region to displace a relatively higher density liquid
    Wherein said energy storage device is discharged by allowing a relatively higher density liquid to displace a relatively lower density liquid and allowing the flow of said lower density liquid to power a generator or hydraulic turbine
A process for storing energy/electricity while simultaneously storing natural gas comprising
  Storing natural gas in gas bags or a storage region beneath the surface of a water body
  Storing electricity compressing or pumping natural gas into said gas bag or storage region, which may expand the volume of said storage region
  Discharging or generating electricity by allowing said natural gas leave said gas bag or storage region and pass through a generator or turbine
  Wherein said storage region is connected to a natural gas pipeline or LNG facility or natural gas facility on the surface through one or more tubes or pipes Example Exemplary Sub-Embodiments Wherein energy is stored in the displacement of a higher density liquid using a lower density liquid under conditions where the pressure head due to gravity of the higher density liquid exceeds the gravitational pressure head of the lower density liquid
Wherein the pump may function as a generator reversibly
Wherein one storage region is located beneath the surface of a water body and another storage region is located near or above the surface of a water body
Wherein said storage regions function as oil or chemicals storage
Wherein said low density liquid or high density liquid or both are the oil or chemicals requiring storage
Wherein the storage region beneath the surface of the water body constitutes a higher pressure, lower head height storage region, while the storage region above the surface of a water body constitutes a lower pressure, higher head height region
Wherein the pump or generator is located near or above the surface of a water body
Wherein said storage region beneath the surface of a water body contains a concave region with an opening near the bottom of said concave region open to the surrounding water body
Wherein a drum or separator separates or is located between the lower density liquid and the water from the surrounding water body
Wherein said storage region beneath the surface of a water body comprises an expandable or contractible or flexible structure, such as a bladder or bag or balloon, which may expand and fill with low density liquid during charging and collapse or contracted or empty during discharging
Wherein said storage region comprising an expandable or contractible or flexible structure may displace water around said storage region
Wherein the high density liquid constitutes water or water body surrounding a storage region
Wherein said storage region beneath the surface of the water body may be anchored or tethered to the ground near the bottom of said water body
Wherein the pump or generator is in contact with the low-density liquid Wherein the pump or generator is in contact with the high-density liquid Wherein the pump or generator is in located beneath the surface of the water Wherein the pump or generator is in contact with the high-density liquid and located near the lower head height, higher pressure storage region Wherein, during charging, the high-density liquid is pumped out of a storage region and the lower density liquid replaces the higher density liquid Wherein one or more storage regions is employed for the storage of one or more chemicals Wherein the low-density liquid or the high density liquid or a both comprise the chemicals being stored Wherein low-density liquid or high density liquid or both may be added or removed from said system Wherein said storage facility/energy storage device is located near an oil platform or chemicals facility Wherein a processing unit is employed to separate out residual high density liquid from low density liquid or vise versa before said liquid or liquids are used or transported after removal from said storage region Wherein the storage units may be employed for storage of oil or chemicals when excess storage is required Wherein the storage units may contain more of, or filled with, or almost fully filled with, or filled with more of low-density liquid to temporarily or semi-permanently or permanently employed for oil or chemical storage, for example, in the event said storage is needed Wherein the storage units may contain more of, or filled with, or almost fully filled with, or filled with more of high-density liquid to temporarily or semi-permanently or permanently employed for oil or chemical storage, for example, in the event said storage is needed Wherein the system may be optimized to prioritize or balance energy storage or oil storage or chemical storage or a combination thereof depending on, for example, including, but not limited to, one or more or a combination of the following:
  The amount of chemicals or oil requiring storage
  The market rate/price for chemical or oil storage
  The market rate/price of energy storage in the electricity grid
  The arbitrage value available for energy storage
  The arbitrage value available for chemical storage Wherein the low density liquid is a low density fluid Wherein said low density fluid comprises a gas Wherein said low density fluid or gas may comprise natural gas Wherein said natural gas may be employed in said system for energy generation and oil natural gas storage Wherein natural gas may be stored in the form of compressed natural gas (CNG) or liquid natural gas (LNG)

Wherein said storage region is connected to a natural gas pipeline or LNG facility or natural gas facility on the surface through one or more tubes or pipes A process for storing energy/electricity while simultaneously storing natural gas comprising
  Storing natural gas in gas bags or a storage region beneath the surface of a water body
  Storing electricity compressing or pumping natural gas into said gas bag or storage region, which may expand the volume of said storage region
  Discharging or generating electricity by allowing said natural gas leave said gas bag or storage region and pass through a generator or turbine
  Wherein said storage region is connected to a natural gas pipeline or LNG facility or natural gas facility on the surface through one or more tubes or pipes Lower head height, higher pressure storage region may be equivalent to the storage region beneath the surface of a water body Energy Density (Butane-Water):

| Head Height (m) | Potential Energy (Wh per m$^3$) (One Cycle) |
| --- | --- |
| 1 | 1.09 |
| 2 | 2.18 |
| 3 | 3.27 |
| 4 | 4.36 |
| 5 | 5.45 |
| 6 | 6.54 |
| 7 | 7.63 |
| 8 | 8.72 |
| 9 | 9.81 |
| 10 | 10.9 |
| 100 | 109 |
| 1000 | 1090 |

Liquid Densities

The table below shows the densities of various example liquids, which may be employed in the technology introduced herein.

| Liquid | Temperature -t- (° C.) | Density -ρ- (kg/m$^3$) |
| --- | --- | --- |
| Acetic Acid | 25 | 1049 |
| Acetone | 25 | 784.6 |
| Acetonitrile | 20 | 782 |
| Alcohol, ethyl (ethanol) | 25 | 785.1 |
| Alcohol, methyl (methanol) | 25 | 786.5 |
| Alcohol, propyl | 25 | 800.0 |
| Ammonia (aqua) | 25 | 823.5 |
| Aniline | 25 | 1019 |
| Automobile oils | 15 | 880-940 |
| Beer (varies) | 10 | 1010 |
| Benzene | 25 | 873.8 |
| Benzil | 15 | 1230 |
| Brine | 15 | 1230 |
| Bromine | 25 | 3120 |
| Butyric Acid | 20 | 959 |
| Butane | 25 | 599 |
| n-Butyl Acetate | 20 | 880 |
| n-Butyl Alcohol | 20 | 810 |
| n-Butylhloride | 20 | 886 |
| Caproic acid | 25 | 921 |
| Carbolic acid (phenol) | 15 | 956 |
| Carbon disulfide | 25 | 1261 |
| Carbon tetrachloride | 25 | 1584 |
| Carene | 25 | 857 |
| Castor oil | 25 | 956.1 |
| Chloride | 25 | 1560 |
| Chlorobenzene | 20 | 1106 |
| Chloroform | 20 | 1489 |
| Chloroform | 25 | 1465 |
| Citric acid, 50% aqueous solution | 15 | 1220 |
| Coconut oil | 15 | 924 |
| Cotton seed oil | 15 | 926 |
| Cresol | 25 | 1024 |
| Creosote | 15 | 1067 |
| Crude oil, 48° API | 60° F. | 790 |
| Crude oil, 40° API | 60° F. | 825 |
| Crude oil, 35.6° API | 60° F. | 847 |
| Crude oil, 32.6° API | 60° F. | 862 |
| Crude oil, California | 60° F. | 915 |
| Crude oil, Mexican | 60° F. | 973 |
| Crude oil, Texas | 60° F. | 873 |
| Cumene | 25 | 860 |

| Liquid | Temperature -t- (° C.) | Density -ρ- (kg/m³) |
|---|---|---|
| Cyclohexane | 20 | 779 |
| Cyclopentane | 20 | 745 |
| Decane | 25 | 726.3 |
| Diesel fuel oil 20 to 60 | 15 | 820-950 |
| Diethyl ether | 20 | 714 |
| o-Dichlorobenzene | 20 | 1306 |
| Dichloromethane | 20 | 1326 |
| Diethylene glycol | 15 | 1120 |
| Dichloromethane | 20 | 1326 |
| Dimethyl Acetamide | 20 | 942 |
| N,N-Dimethylformamide | 20 | 949 |
| Dimethyl Sulfoxide | 20 | 1100 |
| Dodecane | 25 | 754.6 |
| Ethane | −89 | 570 |
| Ether | 25 | 713.5 |
| Ethylamine | 16 | 681 |
| Ethyl Acetate | 20 | 901 |
| Ethyl Alcohol (Ethanol, pure alcohol, grain alcohol or drinking alcohol) | 20 | 789 |
| Ethyl Ether | 20 | 713 |
| Ethylene Dichloride | 20 | 1253 |
| Ethylene glycol | 25 | 1097 |
| Trichlorofluoromethane refrigerant R-11 | 25 | 1476 |
| Dichlorodifluoromethane refrigerant R-12 | 25 | 1311 |
| Chlorodifluoromethane refrigerant R-22 | 25 | 1194 |
| Formaldehyde | 45 | 812 |
| Formic acid 10% concentration | 20 | 1025 |
| Formic acid 80% concentration | 20 | 1221 |
| Fuel oil | 60° F. | 890 |
| Furan | 25 | 1416 |
| Furforol | 25 | 1155 |
| Gasoline, natural | 60° F. | 711 |
| Gasoline, Vehicle | 60° F. | 737 |
| Gas oils | 60° F. | 890 |
| Glucose | 60° F. | 1350-1440 |
| Glycerine | 25 | 1259 |
| Glycerol | 25 | 1126 |
| Heating oil | 20 | 920 |
| Heptane | 25 | 679.5 |
| Hexane | 25 | 654.8 |
| Hexanol | 25 | 811 |
| Hexene | 25 | 671 |
| Hydrazine | 25 | 795 |
| Ionene | 25 | 932 |
| Isobutyl Alcohol | 20 | 802 |
| Iso-Octane | 20 | 692 |
| Isopropyl Alcohol | 20 | 785 |
| Isopropyl Myristate | 20 | 853 |
| Kerosene | 60° F. | 820.1 |
| Linolenic Acid | 25 | 897 |
| Linseed oil | 25 | 929.1 |
| Machine oil | 20 | 910 |
| Mercury | | 13590 |
| Methane | −164 | 465 |
| Methanol | 20 | 791 |
| Methyl Isoamyl Ketone | 20 | 888 |
| Methyl Isobutyl Ketone | 20 | 801 |
| Methyl n-Propyl Ketone | 20 | 808 |
| Methyl t-Butyl Ether | 20 | 741 |
| N-Methylpyrrolidone | 20 | 1030 |
| Methyl Ethyl Ketone | 20 | 805 |
| Milk | 15 | 1020-1050 |
| Naphtha | 15 | 665 |
| Naphtha, wood | 25 | 960 |
| Napthalene | 25 | 820 |
| Nitric acid | 0 | 1560 |
| Ocimene | 25 | 798 |
| Octane | 15 | 698.6 |
| Oil of resin | 20 | 940 |
| Oil of turpentine | 20 | 870 |
| Oil, lubricating | 20 | 900 |
| Olive oil | 20 | 800-920 |
| Oxygen (liquid) | −183 | 1140 |
| Paraffin | | 800 |
| Palmitic Acid | 25 | 851 |
| Pentane | 20 | 626 |
| Pentane | 25 | 625 |
| Perchlor ethylene | 20 | 1620 |
| Petroleum Ether | 20 | 640 |
| Petrol, natural | 60° F. | 711 |
| Petrol, Vehicle | 60° F. | 737 |
| Phenol (carbolic acid) | 25 | 1072 |
| Phosgene | 0 | 1378 |
| Phytadiene | 25 | 823 |
| Pinene | 25 | 857 |
| Propane | −40 | 493.5 |
| Propane, R-290 | 25 | 494 |
| Propanol | 25 | 804 |
| Propylenearbonate | 20 | 1201 |
| Propylene | 25 | 514.4 |
| Propylene glycol | 25 | 965.3 |
| Pyridine | 25 | 979 |
| Pyrrole | 25 | 966 |
| Rape seed oil | 20 | 920 |
| Resorcinol | 25 | 1269 |
| Rosin oil | 15 | 980 |
| Sea water | 25 | 1025 |
| Silane | 25 | 718 |
| Silicone oil | 25 | 965-980 |
| Sodium Hydroxide (caustic soda) | 15 | 1250 |
| Sorbaldehyde | 25 | 895 |
| Soya bean oil | 15 | 924-928 |
| Stearic Acid | 25 | 891 |
| Sulfuric Acid 95% concentration | 20 | 1839 |
| Sulfurus acid | −20 | 1490 |
| Sugar solution 68 brix | 15 | 1338 |
| Sunflower oil | 20 | 920 |
| Styrene | 25 | 903 |
| Terpinene | 25 | 847 |
| Tetrahydrofuran | 20 | 888 |
| Toluene | 20 | 867 |
| Trichlor ethylene | 20 | 1470 |
| Triethylamine | 20 | 728 |
| Trifluoroacetic Acid | 20 | 1489 |
| Turpentine | 25 | 868.2 |
| Water, heavy | 11.6 | 1105 |
| Water - pure | 4 | 1000 |
| Water - sea | 77° F. | 1022 |
| Whale oil | 15 | 925 |
| o-Xylene | 20 | 880 |

Low density liquid or high density liquid may be sourced from, for example, waste products. For example, the low density liquid or the high density liquid may be sourced from, for example, including, but not limited to, one or more or a combination of the following: waste cooking oil, waste plastic, waste plastic converted into liquids, waste plastic converted into fuel oil, waste glycerol, waste alcohol, waste coolant, waste antifreeze, waste lubricant, waste fuel, contaminated oil, contaminated chemicals, or expired goods.

Prior Art, Incorporated Herein by Reference (*Ocean Renewable Energy Storage (ORES) System: Analysis of an Undersea Energy Storage Concept*, 2013, 10.1109/JPROC 0.2013.2242411, https://ieeexplore.ieee-.org/document/6471167/)(https://www.renewableenergyworld.com/articles/2016/09/storing-energy-in-the-sea-a-new-design-for-marine-energy-storage.html).

Application Ser. No. 14/003,567, 20140060028, Pumped-Storage Power Plant https://patents.justia.com/patent/20140060028

Third Description of Embodiments

Tidal Power System

Description:

The present embodiments may relate to systems and methods for generating energy from the change in water level due to tides. Some embodiments may be applicable to, for example, a tidal power energy generation system, which generates energy from change in water level due to, for example, tides. Some embodiments may involve using the displacement of air or other fluid from a storage region due to a rise in water level due to tides to generate energy, such as electricity. Some embodiments may involve using the movement of air or other fluid into a storage region due to a decrease in water level due to tides to generate electricity. The movement of air or displacement of air may be transferred through one or more tubes to, for example, the surface and/or may be converted to electricity using, for example, a pneumatic generator. The generation of electricity, pneumatic pump, pneumatic generator, and/or other components may be located on the surface outside the water or storage region if desired. Another gas or fluid other than air or in addition to air or in combination with air may be employed if desired. Said storage region may comprise a water or air or fluid impermeable material or structure with a concave region containing space which can be occupied by a fluid. Said concave region may be occupied by a porous material, for example, sand or rocks or cinder blocks or plastic bottles or packing material, which may contain space which can be occupied by a fluid, such as water or air. Said storage region may comprise a water or air tight liner or tarp which forms a concave region over a portion of sand or rock or cinder blocks or plastic bottles or packing material or solid material with space which can be occupied by a fluid, such as water or air. Said storage region may comprise a rigid structure such as an old ship, or a plastic container. Said storage region may comprise a bag, or bladder, or flexible structure, which may be expanded when filled with a gas or a low density liquid at, for example, lower tides, and collapsible when said gas or low density liquid is released through, for example, a generator, at higher tides. Said concave region may comprise open space which may be occupied by a fluid, such as water or air. Said concave region may be positioned such that the concave region faces the direction of the earth's surface (e.g. the direction of the force of gravity) such that a lower density fluid may be trapped in said concave region if desired. Said concave region may contain a tube with an opening inside said concave region. Said tube may be interconnected to the surface, where it may be connected to a pneumatic pump or generator or a hydraulic pump or generator. Said tube may be placed under and around said concave region, as opposed to, for example, through the material of said storage region, as this may reduce the likelihood of leaks through said storage region.

The concave region or storage region may comprise infrastructure employed for another purpose, which may include, but is not limited to, one or more or a combination of the following: a sewer system, a drainage system, a runoff water system, a wastewater system, a drainage pipe, an intake pipe, an outflow pipe, or a water storage region.

A concave region or storage region may be filled with a porous material fill. Said porous material fill may comprise, including, but not limited to, one or more or a combination of the following: sand, gravel, rock, packing material, or cinderblock, or plastic bottles, or plastic containers, or plastic buckets, or interconnected cinderblock, or interconnected plastic containers, or interconnected packing material.

The concave region or storage region may be built into or may be a component of a pre-existing or new marine structure. For example, a concave region or storage region (which may be integrated with an air tube and pneumatic generator/pump) may be fabricated as a component causeway, breakwall, building foundation, landfill or land expansion, or artificial island. Advantageously, the subsurface of waterfront land, which is rarely seen or utilized after construction, may be transformed into a means for generating renewable electricity from the tides or changes in water level of a water body.

For example, a concave region or storage region may be constructed as part of a causeway or landfill or artificial island in three general steps: 1) Air tubes may be placed in the region where the marine structure will be constructed. The air tubes may have an end which is located at a vertical height near the vertical height of the eventually constructed concave region or storage region. If advantageous, a water pipe may be placed in the region where the marine structure will be constructed to facilitate water flow in the eventually constructed concave region or storage region. Alternatively, water seepage or permeate may be the sole source of water flow if, for example, a water pipe is not employed. 2) Porous material fill, such as rock, or sand, or cinder block, or other fill materials, or other porous fill materials described herein, or a combination thereof, may be added. Said fill materials may comprise the interior of the concave region or storage region. Said fill materials may surround the air tubes. It may be desirable for said fill materials to surround, although not substantially or completely block or kink or clog an air tube. Fill materials may be carefully placed to match a design or the contour of the storage region or concave region liner. 3) A liner may be placed over said fill materials and pipe. It may be desirable for the liner to match the contour of the fill materials and it may be desirable for the liner to surround the fill materials for the full vertical depth of the fill materials or storage region. A liner may include, but is not limited to, one or more or a combination of the following: a HDPE liner, or LDPE liner, or aluminum liner, or steel liner, or metal coated liner, or metal liner, or cement liner, a cement layer, or clay liner, or landfill liner, or pond liner, or lake liner, storage basin liner, or a nylon liner, or geosynthetic liner, or PVC liner, or bag, or fabric, or textile, or mesh, or high strength polymer liner, or woven liner, or braided liner, or liner comprising multiple layers of materials for strength and fluid tightness, or tarp.

After the liner has been placed, materials comprising the rest of the marine structure may be added to, for example, construct the marine structure. If advantageous, buffer materials may be added to the top or bottom of the liner to minimize potential wear and tear or prevent the formation of perforations in the liner. Said buffer materials may include, but are not limited to, one or more or a combination of the following: sand, or burlap, or twine, or woven nyon, or Kevlar, or gravel, or clay, or mud, or foam, or cement, or concrete, or mesh, or fabric, or textile, or rubber. Advantageously, it is possible to construct the present tidal power system with no moving parts beneath the surface of the water, or underground, or inside the storage region or cavity.

For example, a concave region or storage region may be constructed as an aspect of an artificial reef or from vessels or structures which may otherwise be sunk. For example, a concave region or storage region may be constructed from using upside-down vessel or ship or boat or tank or barge.

Advantageously, the hull of a ship may already be fluid tight, although additional patching or re-enforcement may be employed if desired. An example implementation may involve one or more of the following steps: 1) placing tubing and/or water pipes inside said vessel. An opening of the air tubing may be placed or attached near the bottom of the vessel (which may be near the eventual top of the storage region or concave region when said vessel becomes a storage region or concave region). Water tubing may be employed to facilitate water flow in and out of the storage region or concave region. 2) Placing porous filling material into at least a portion of said vessel. Said porous filling material may be employed to prevent the vessel from floating when the vessel open space is occupied by air. Alternatively or additionally, said vessel may be prevented from floating by using anchors and lines, which may be evenly distributed across the vessel. If necessary, a portion of the remaining air space inside the vessel may be filled with water to promote sinking. 3) Flipping said vessel upside down and placing said vessel at or near the bottom of the water body. It may be desirable for the fill material to be at least partially contained in the vessel to prevent significant uncontrolled spilling of fill material. Fill material may be contained due to at least partially covered compartments inside said vessel. Alternatively or additionally, said fill materials may be contained using a fabric or mesh or twine or net. It may be advantageous to conduct this step when the vessel is near the bottom of said water body to, for example, minimize uncontrolled spilling of fill material. Air pipes may be connected to an air pump or pneumatic generator located near, at, or above the surface. Water pipes may be open to the surrounding water body. Advantageously, if a storage region or concave region is located near the bottom of a water body, it may experience near or close to the full hydraulic head of the water body throughout the energy generation step, although this may be dependent on the vertical height of said concave region relative to the depth of the water body and water level difference between low and high tide.

Some embodiments may generate electricity from the difference in hydraulic pressure in a storage region in a water body due to the change with water level, which may be due to tides. An embodiment may involve a storage region beneath the surface of a water body. During relatively lower water levels or tides, air may be pumped into the storage region using, for example, one or more tubes, displacing water in said storage region. During relatively higher water levels or tides, water may be allowed to displace air from said storage region, and said air may pass through, for example, one or more tubes into pneumatic generator, generating useful work or electricity. It is important to note that at higher water levels or tides, the hydraulic pressure in the storage region may be significantly greater than the hydraulic pressure in the storage region during lower water levels or tides. Net energy or electricity may be generated due to, for example, the significantly greater amount of energy or electricity generated from air being displaced into a generator at higher tides or water levels than the energy or electricity required to pump air into said storage region during lower water levels or tides. Net energy or electricity generated may comprise the difference in between the energy generated during higher water levels or tides compared to the energy consumed during lower water levels or tides.

Embodiments may generate electricity during one or more of the tide cycles. For example, some embodiments may generate electricity during four tide cycles in a ~1 day period (for example: 2 high tides, two low tides)—an example of this may be an embodiment employing an underground cavity with depth in the range of the ocean water level at higher or lower or both tides. For example, some embodiments may generate electricity during two tide cycles in a ~1 day period (for example: 2 high tides)—an example of this may be an embodiment employing an under water storage region at below or near or about same water depth of the low tide depth in a region. For example, some embodiments may generate electricity during less cycles than their available capacity—an example of this may be an embodiment employing an underground cavity with depth in the range of the ocean water level at higher or lower or both tides wherein the process generates electricity during only higher tides. An embodiment which only generates electricity during higher tides may be advantageous as some cavities may not be structurally suitable for partial vacuums, which may be required to generate electricity during all four tide movements during a day.

The process may employ a hydroelectric or hydro generator if advantageous. It is important to note to minimize costs and maximize longevity, it may be advantageous to employ a pneumatic generator powered by air displacement.

Cavity, storage region, or concave region may be analogous or synonym terms.

Example Advantages

Cost:
  Material cost is low. Material cost may simply comprise a liner, pipes, filling material (if not already available in the surrounding environment), and pneumatic generator or pump
  Labor cost may vary depending on whether the installation is part of another project, such as the construction of a marine structure, and whether the installation required digging beneath the surface of the ground or dredging.
Resilience and durability:
  Some embodiments may be located underground or beneath the surface of a water body, reducing potential hazards from waves and debris
  Some embodiments may have no moving parts beneath the surface of the water body, reducing or eliminating potential complications from corrosion, fouling, or debris
  Moving parts may, if desired, not be in contact or direct contact with water or the water body, reducing their cost and increasing their expected lifespan
Efficiency
  Pneumatic generators powered using relatively low pressure pressurized air can produce electricity at an efficiency greater than 50%, or greater than 60%, or greater than 70%, or greater than 80%, or greater than 90%.

Example Step by Step Descriptions

Underground Air & Water Cavity:
  Overview:
  FIGS. 14-19 may show embodiments employing an underground storage region or cavity. Each figure may show an example step in the process of generating electricity from changes in water level due to, for example, including, but not limited to, tides. In FIGS. 14-19, the storage region or cavity may comprise mostly open space for fluid, such as air or water, to occupy.

Figure 14:
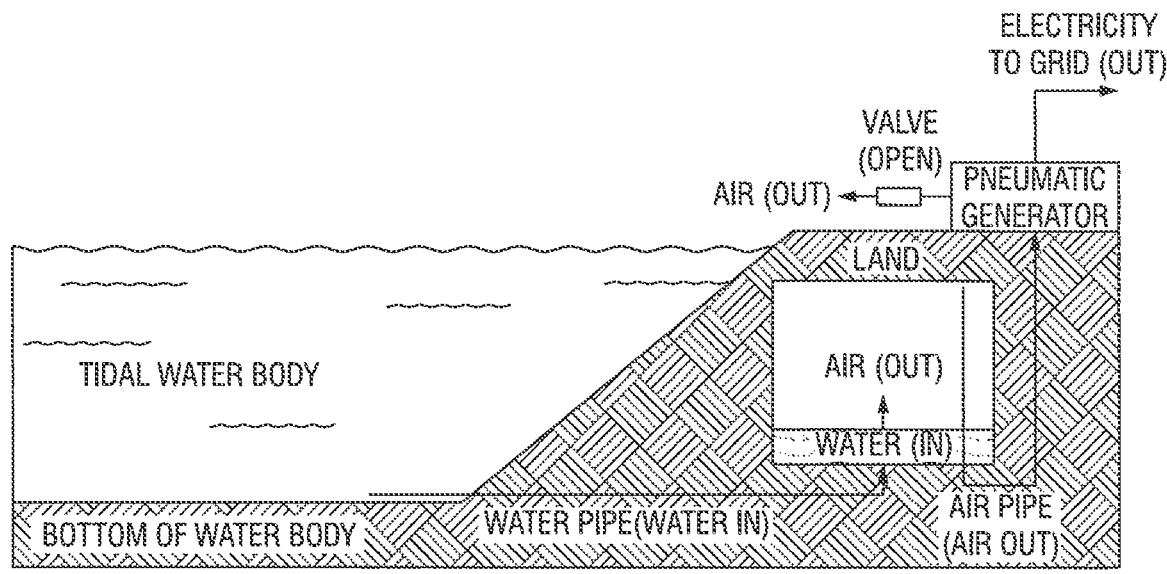
FIG. 14: Step 1 (Higher Tide, Filling, And Electricity Generation)

FIG. 14: Step 1 (Higher Tide, Filling, Electricity Generation): FIG. 14 may show an embodiment where electricity is being generated. Air is allowed to be released through the opening of a valve in the air tube or pneumatic pump, which allows air to exit storage region through a pipe into a pneumatic generator, which may generate electricity. Due to the relatively high water level in the surrounding or nearby water body relative to the water level in the storage region, the air pressure in the storage region may be greater than the atmosphere air pressure. Water from the surrounding or nearby water body may pass through a pump or travel via seepage into the storage region, displacing the air in said storage region. The flow rate of air exiting the storage region and the rate of water entering the storage region may be controlled by controlling the flow rate of air entering the pneumatic generator.

Figure 15:
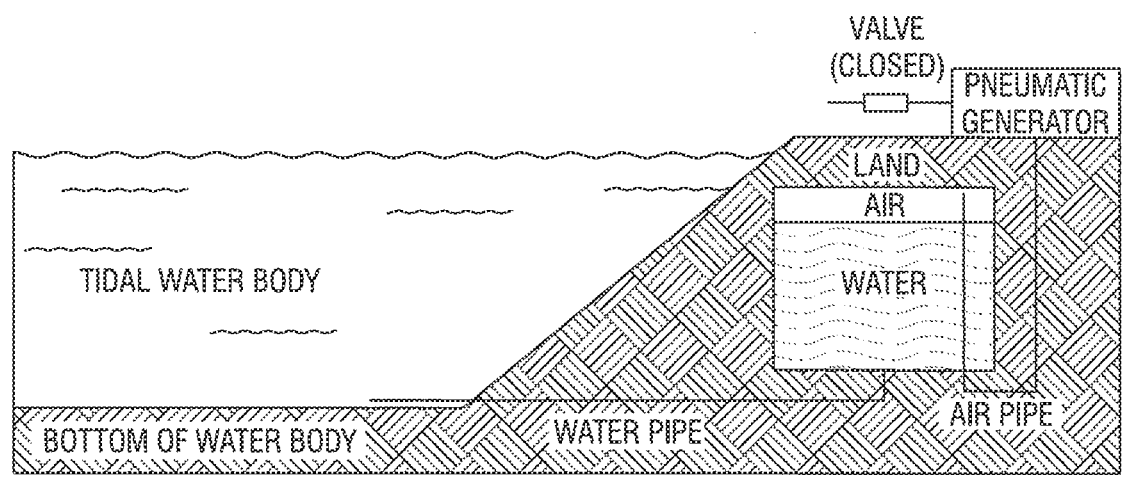
FIG. 15: Step 2 (High Tide, Cavity Full)

FIG. 15: Step 2 (High Tide, Cavity Full): FIG. 15 may show an embodiment where the storage region is nearly full with water. The storage region may be considered nearly full with water when it achieves either of the following: 1) the water level in the storage region is near or at the maximum water level in the nearby water body's recent tide range; or 2) the water volume reaches the maximum practical volumetric capacity of the storage region.

Figure 16:
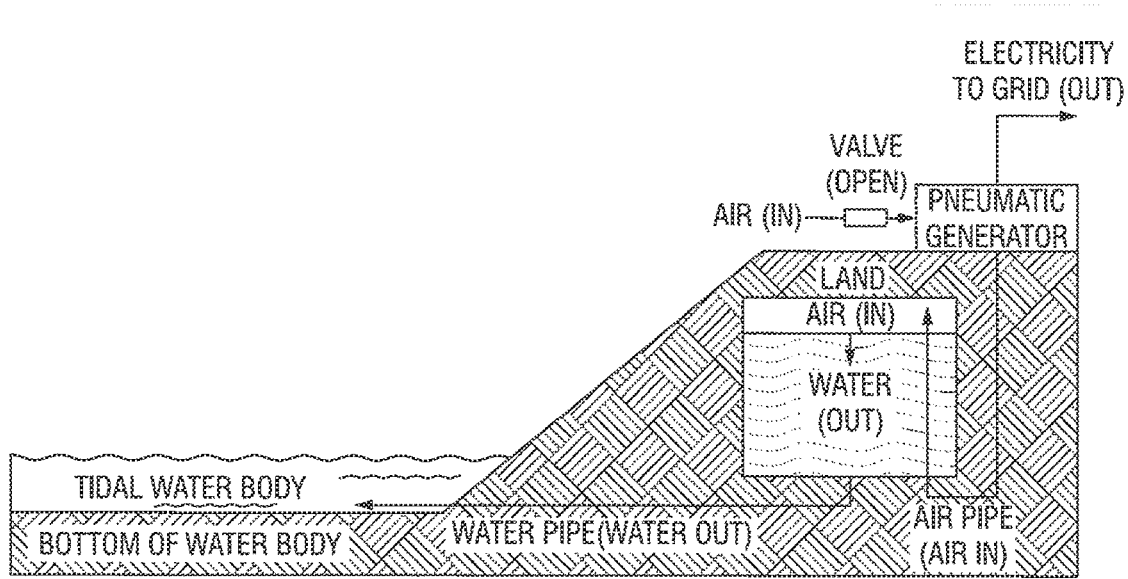
FIG. 16: Step 3 (Lower Tide, Emptying, Generating Electricity)

FIG. 16: Step 3 (Lower Tide, Emptying, Generating Electricity): FIG. 16 may show an embodiment generating electricity when the surrounding water body water level is relatively low compared to the water level inside the storage region. Energy may be generated due to the flow of air into the storage region as water exits said storage region, and where said flow of air powers, for example, a pneumatic generator. The flow of water out of said storage region may be through a water pipe or water seepage. It is important to note depth of the storage region or, if a water pipe is connected to the storage region, the depth of the water pipe, may desirably be lower than the depth of the water in water body to prevent uncontrolled water exiting or air entering the storage region. Air flow and water exiting may be controlled through the opening of a valve in connected to the air tube or pneumatic generator.

Figure 17:
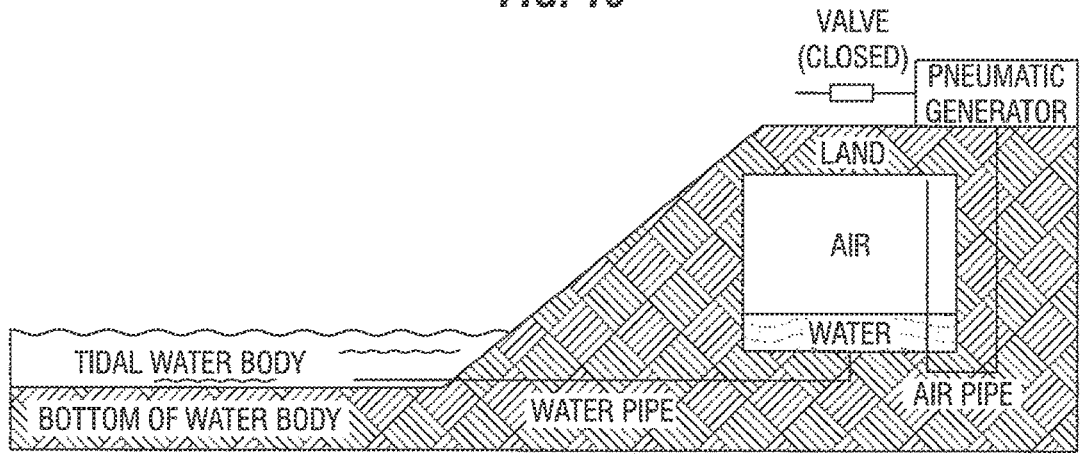
FIG. 17: Step 4 (Lower Tide, Empty)

FIG. 17: Step 4 (Lower Tide, Empty): FIG. 17 may show an embodiment where the storage region is nearly empty with water. The storage region may be considered nearly empty with water when it achieves one of the following: 1) the water level in the storage region is near or at the minimum water level in the nearby water body's recent tide range; or 2) there is no water in the storage region.

Figure 18:
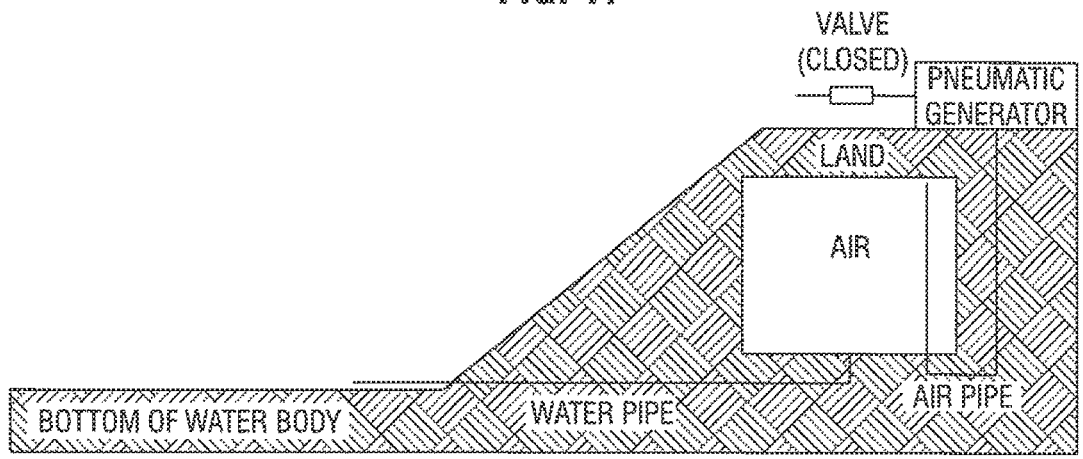
FIG. 18: Step 4 Alternative (Lower Tide, Empty, depending on time of year and location)

FIG. 18: Step 4 Alternative (Lower Tide, Empty, depending on time of year and location): FIG. 18 may show an embodiment where the storage region is fully empty with water. It is important to note that energy generation from water exiting a storage region may require the water pipe or the storage region to be at least partially beneath the surface of the water to prevent unintentional air or water flow. It is important to note that a storage region occupied almost entirely by air may maximize the potential energy generation capacity.

Figure 19:
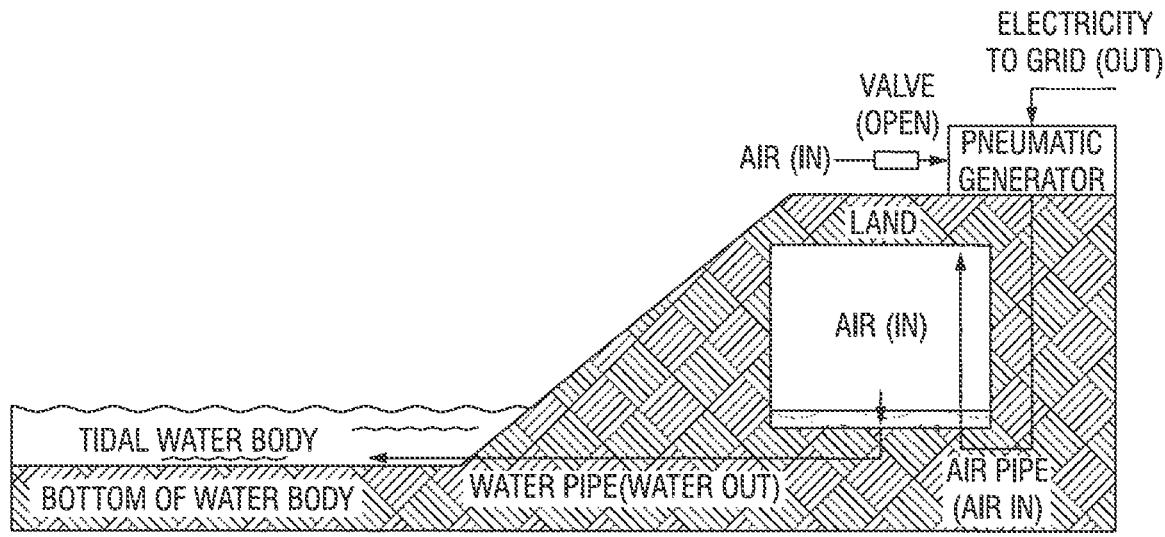
FIG. 19: Step 5 (Lower Tide, Pump remaining water out)

FIG. 19: Step 5 (Lower Tide, Pump remaining water out): FIG. 19 may show an embodiment where air is pumped into a storage region to remove residual water. Pumping air into the storage region may be conducted, for example, while the water level in the surrounding water body is relatively low. The energy required to pump air into the storage region (and displacing residual water) at a lower tide may be significantly less the than the energy generated from the increase in displaceable volume occupied by air in the storage region. Additionally, air may be pumped into the storage region to remove water which may have been trapped in the air pipe.

Example Embodiment where Water/Air Cavity or Storage Region Contains a Porous Material:

Overview:

FIGS. 20-23 may show embodiments employing an underground storage region or cavity. Each figure may show an example step in the process of generating electricity from changes in water level due to, for example, including, but not limited to, tides. In FIGS. 14-19, the storage region or cavity may comprise mostly porous filling material, which may contain space for fluid, such as air or water, to occupy. The steps for generating electricity may be similar to the steps shown in FIGS. 14-19.

Figure 20:
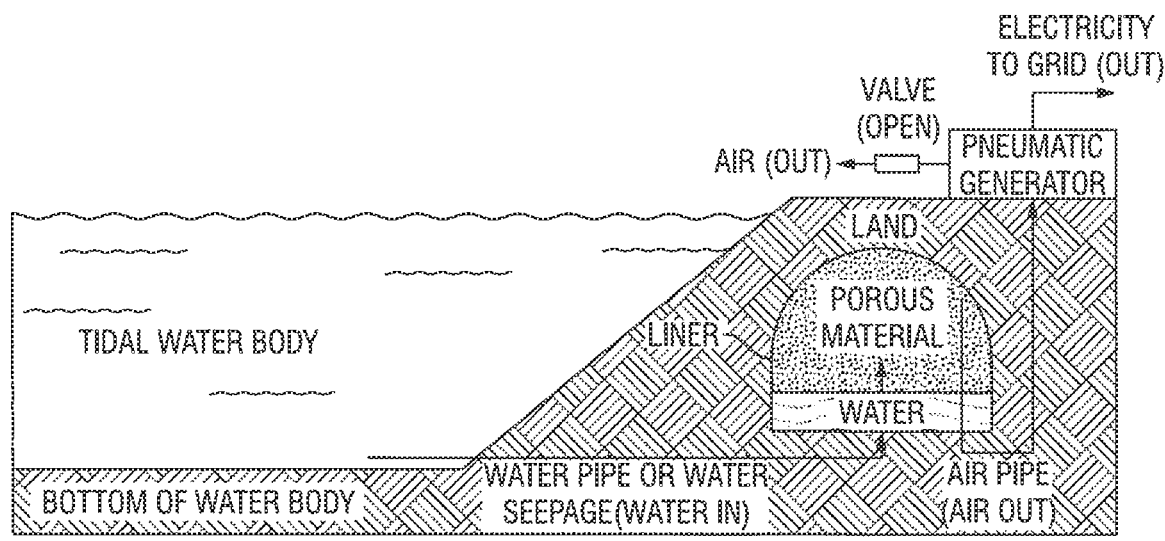
FIG. 20: Step 1 (Higher Tide, Filling, Electricity Generation)

FIG. 20: Step 1 (Higher Tide, Filling, Electricity Generation): FIG. 20 shows an example embodiment where water/air cavity or storage region contains a porous material.

Figure 21:
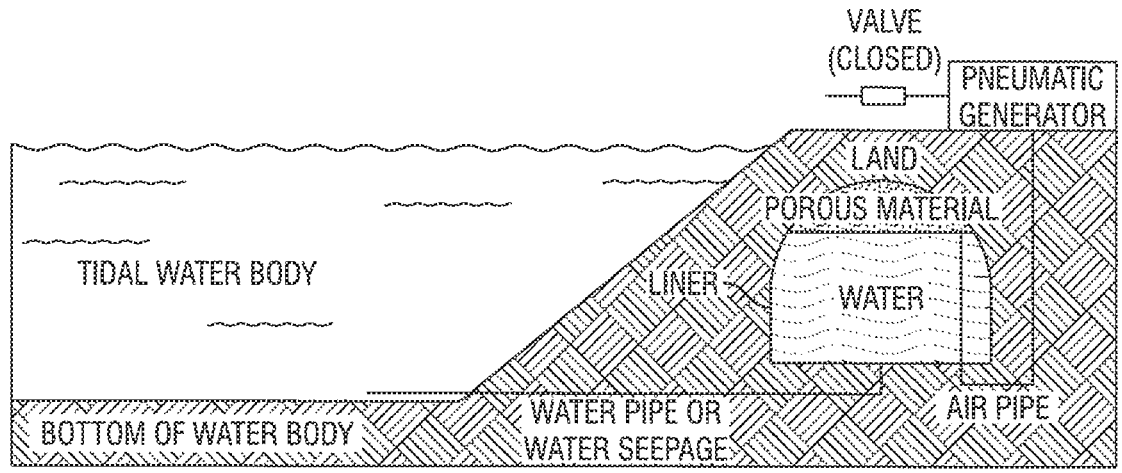
FIG. 21: Step 2 (High Tide, Cavity Full)

FIG. 21: Step 2 (High Tide, Cavity Full): FIG. 21 shows an example embodiment where water/air cavity or storage region contains a porous material.

Figure 22:
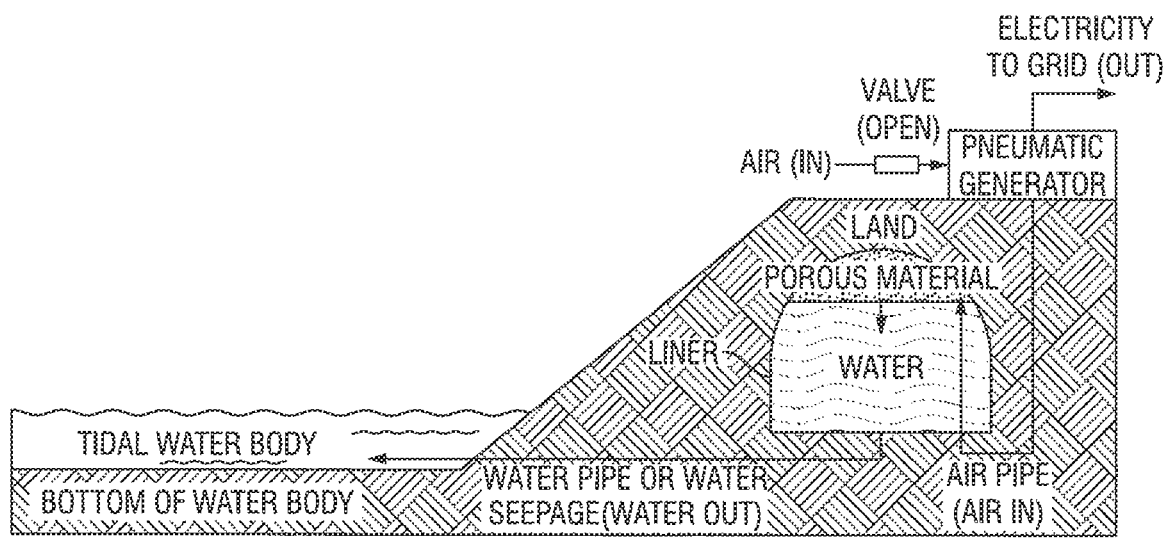
FIG. 22: Step 3 (Lower Tide, Emptying, Generating Electricity)

FIG. 22: Step 3 (Lower Tide, Emptying, Generating Electricity): FIG. 22 shows an example embodiment where water/air cavity or storage region contains a porous material.

Figure 23:
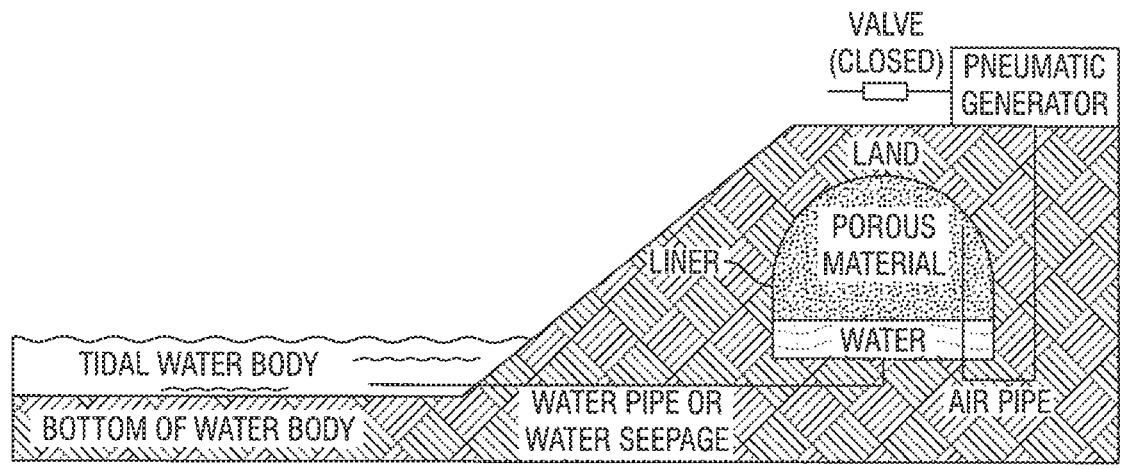
FIG. 23: Step 4 (Lower Tide, Empty)

FIG. 23: Step 4 (Lower Tide, Empty): FIG. 23 shows an example embodiment where water air cavity or storage region contains a porous material.

Figure 24:
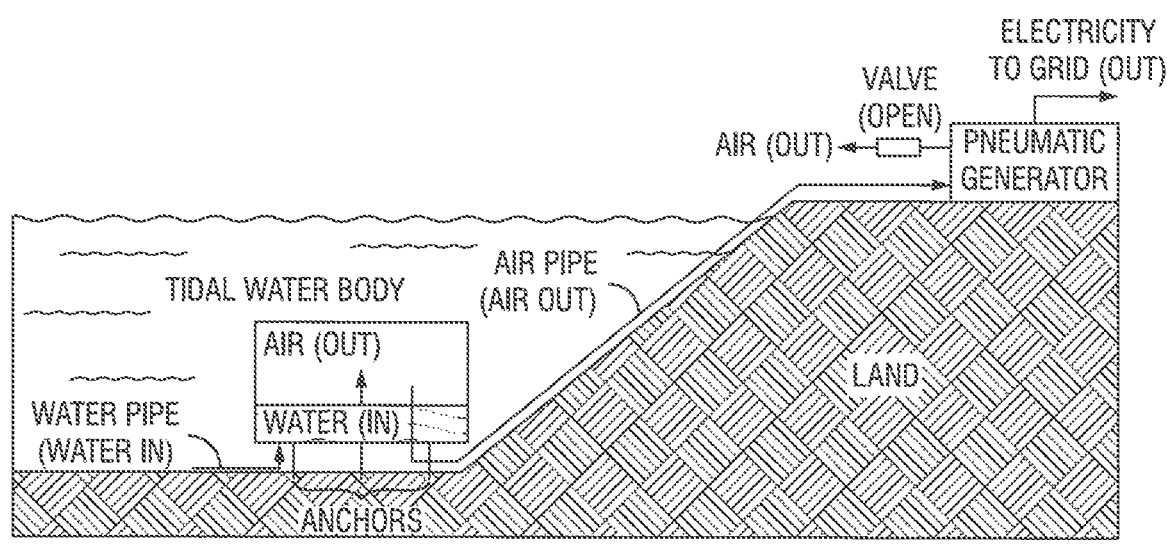
FIG. 24: Step 1 (Higher Tide, Filling, Generating Electricity)

Under Water Vessel (May be Near Full Head Height Throughout Power Generation):

FIG. 24: Step 1 (Higher Tide, Filling, Generating Electricity): FIG. 24 shows an example embodiment where water/air cavity or storage region is located on or within a water body.

Figure 25:
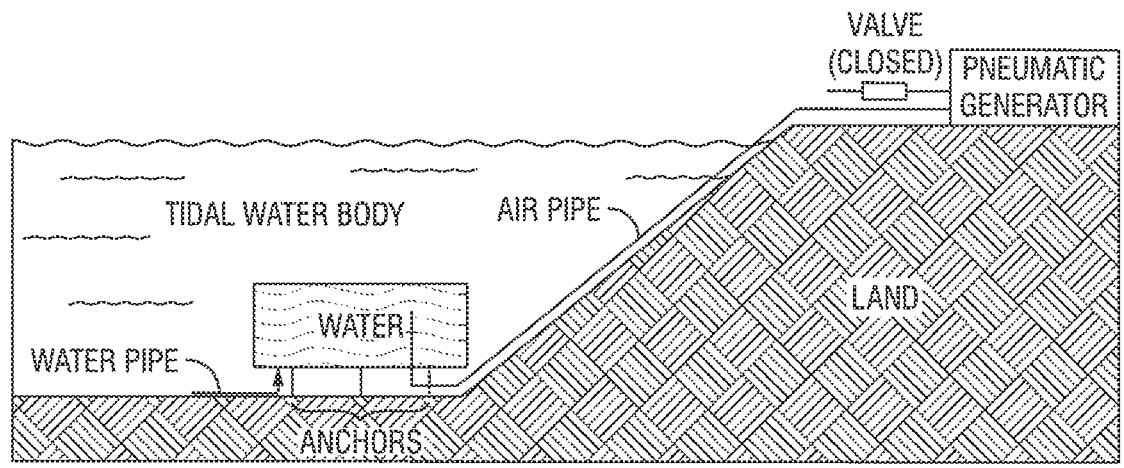
FIG. 25: Step 2 (Higher Tide, Full)

FIG. 25: Step 2 (Higher Tide, Full): FIG. 25 shows an example embodiment where water/air cavity or storage region is located on or within a water body.

Figure 26:
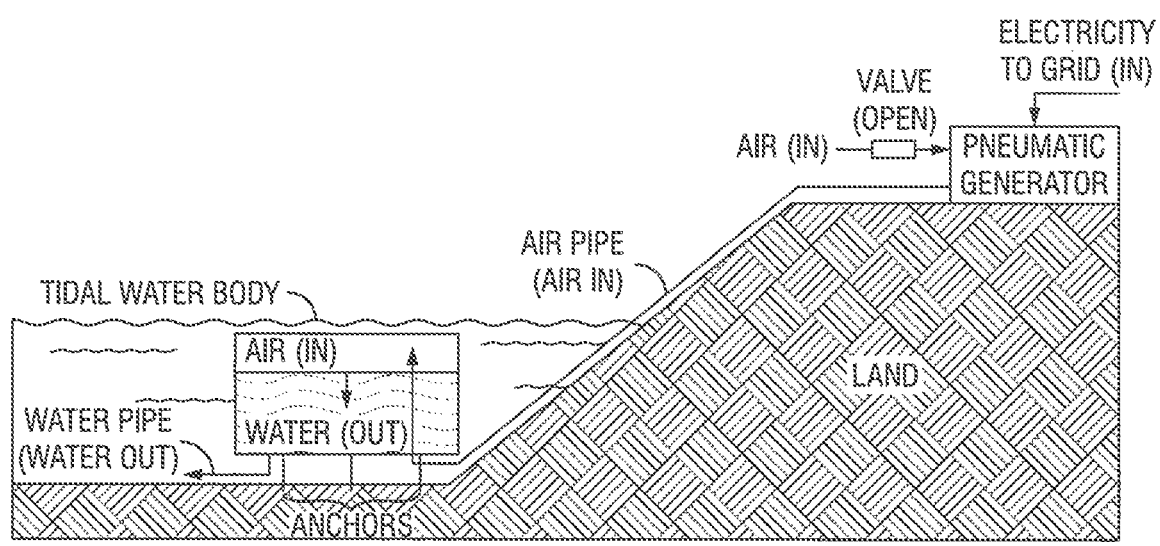
FIG. 26: Step 3 (Lower Tide, Emptying)

FIG. 26: Step 3 (Lower Tide, Emptying): FIG. 26 shows an example embodiment where water/air cavity or storage region is located on or within a water body.

Figure 27:
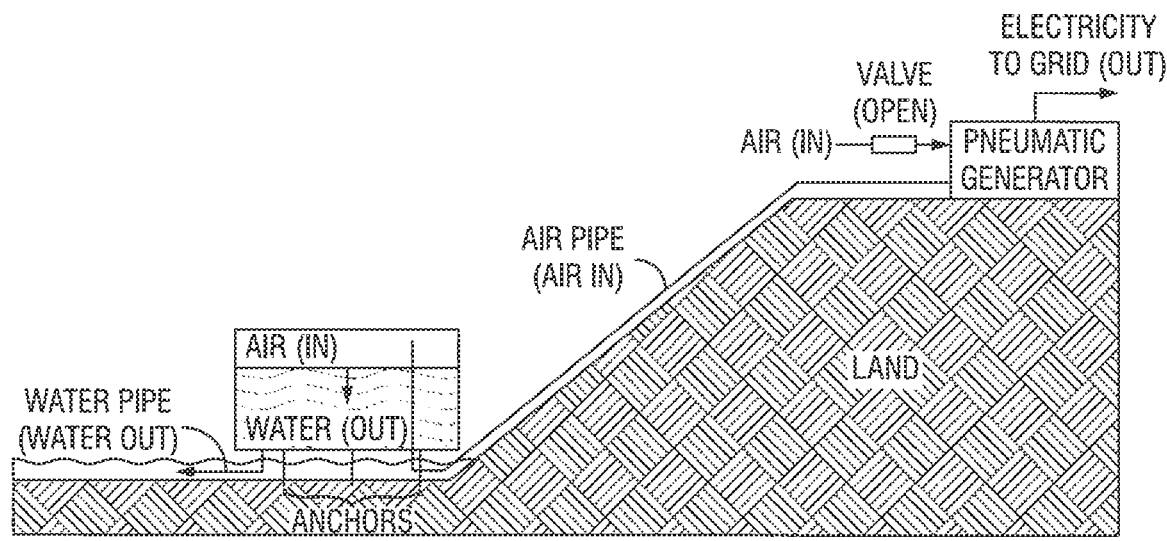
FIG. 27: Alternative Step 3 (Lower Tide, Emptying, Depending on Tide and Location)

FIG. 27: Alternative Step 3 (Lower Tide, Emptying, Depending on Tide and Location): FIG. 27 shows an example embodiment where water/air cavity or storage region is located on or within a water body.

Figure 28:
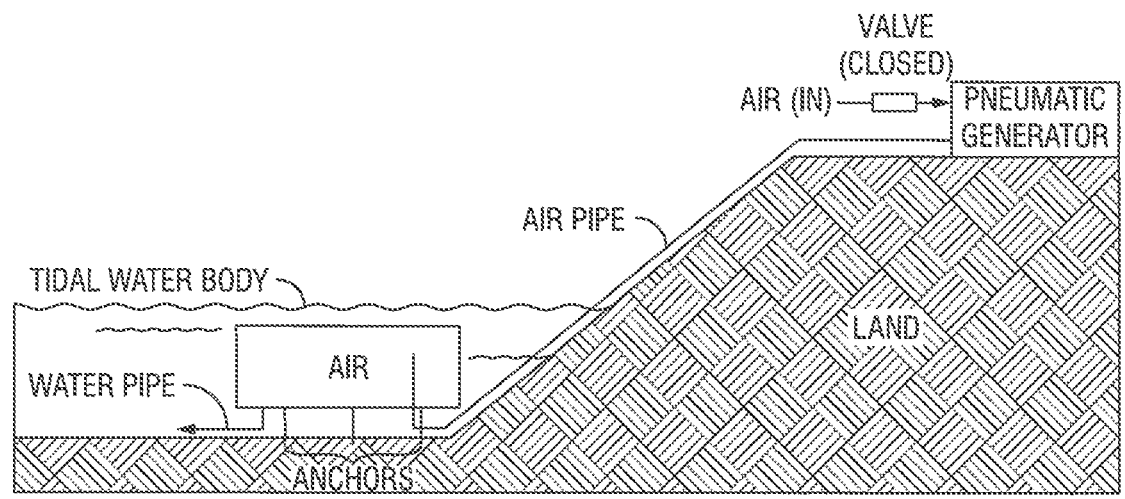
FIG. 28: Step 4 (Lower Tide, Empty)

FIG. 28: Step 4 (Lower Tide, Empty): FIG. 28 shows an example embodiment where water/air cavity or storage region is located on or within a water body.

Figure 29:
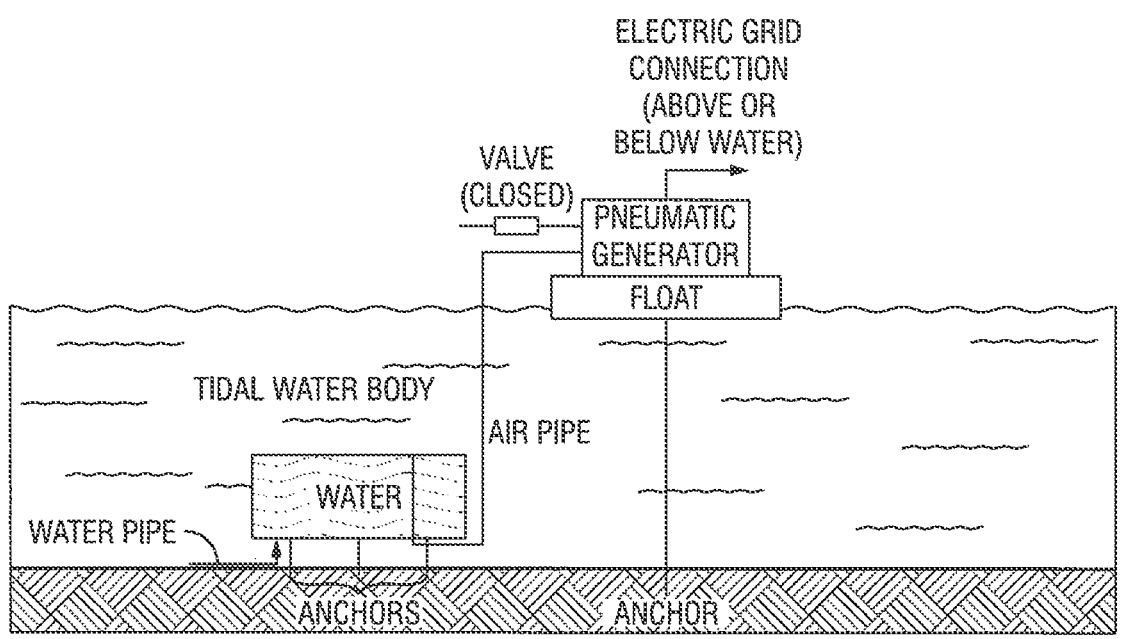
FIG. 29.

FIG. 29: FIG. 29 shows an example embodiment with a floating pump or generator station.

It will be appreciated that while many of the above figures show the vessel or other storage structure at or near the bottom of the water body, it may be located at any convenient location below the surface. In some embodiments it may be moored to the bottom and/or the top of the water body.

Air may be substituted with other fluids described herein. In the case where the fluid comprises a liquid, a hydraulic or hydroelectric generator may be employed instead of a pneumatic generator.

Relatively higher tides are when the water level in a water body is higher than the water level during relatively lower tides. Water level changes may be due to primarily changes in the water level due to gravitational tides.

Example Exemplary Embodiments

A tidal power system comprising:
- A region comprising a cavity, or concave region, or a storage region surrounded by at least a portion water impermeable material
- Wherein water displaces air from said region at relatively high tides,
- Wherein air displaces water at relatively lower tides
- Wherein electricity is generated from movement of air to or from said region

Example Exemplary Sub-Embodiments

- Wherein energy or electricity is generated using a pneumatic turbine or generator
- Wherein said region is located beneath the surface of the ground, or inside a causeway, or a landfill, or an artificial island, or a breakwall, or a building foundation, or a structure foundation, or a combination thereof
- Wherein said storage region contains a porous fill material
- Wherein said porous fill material comprises one or more or a combination of the following: sand, gravel, rock, packing material, or cinderblock, or plastic bottles, or plastic containers, or plastic buckets, or interconnected cinderblock, or interconnected plastic containers, or interconnected packing material
- Wherein said water impermeable material may comprise a liner
- Wherein air exits and enters said region using a pipe
- Wherein said pipe has an opening inside said storage region or an opening above the surface of the water or both
- Wherein water enters or exits said region via water seepage
- Wherein water enters or exits said region via a pipe
- Wherein water enters or exits said region through an opening in said region or water impermeable material
- Wherein said is structurally rigid
- Wherein said region is structurally flexible or expandable or collapsible and may comprise a bladder, bag, or similar device
- Wherein said air is located inside said structurally flexible region and said structurally flexible region is inflated during lower tides and collapsed during higher tides
- Wherein said collapsing generates electricity through the displacement of air from said structurally flexible region into a pneumatic generator
- Wherein said region comprises infrastructure employed for another purpose, such as one or more or a combination of the following: a sewer system, a drainage system, a runoff water system, a wastewater system, a drainage pipe, an intake pipe, an intake system, an outflow pipe, an outflow system, or a storage region.
- Wherein a liner comprises one or more or a combination of the following: a HDPE liner, or LDPE liner, or aluminum liner, or steel liner, or metal coated liner, or metal liner, or cement liner, a cement layer, or clay liner, or landfill liner, or pond liner, or lake liner, storage basin liner, or a nylon liner, or geosynthetic liner, or PVC liner, or bag, or fabric, or textile, or mesh, or high strength polymer liner, or woven liner, or braided liner, or liner comprising multiple layers of materials for strength and fluid tightness, or tarp.
- Wherein said region is constructed as an aspect of an artificial reef or from vessels or structures which may otherwise be sunk or a combination thereof
- Wherein air is pumped into said region during lower tides and air is released from said region into a generator during higher tides
- Wherein the energy generated during higher tides exceeds the energy consumed during lower tides
- Wherein air is pumped into said region to store electricity
- Wherein air is released from said region to generate electricity
- Wherein the present invention can function as a tidal power energy generation device, an energy storage device, or both

Specific Embodiments

Embodiments for "Systems and Methods for Preventing Fouling of Marine Structures"

1. A system for reducing fouling on an aquatic structure comprising:
an aquatic structure comprising at least one surface exposed to water;
a concave region on at least one portion of the surface exposed to water wherein said concave region is configured to maintain a substantially non-contiguous physical separation between water and said region and wherein at least a portion of said concave region is occupied with a gas.

2. The system of Embodiment 1 wherein the substantially non-contiguous physical separation is maintained by controlling the amount of gas in said concave region.

3. The system of Embodiment 1 further comprising a controller and a gas source operably connected to said concave region wherein the controller and gas source control the amount of gas.

4. The system of Embodiment 3 wherein said controller and gas source are employed to displace water with gas in at least a portion of said concave region.

5. The system of Embodiment 1 wherein the said gas pocket is controllably immobilized for a controlled period of time.

6. The system of Embodiment 5 wherein said time is at least about 5 seconds.

7. The system of Embodiment 1 wherein said substantially non-contiguous physical separation is present greater than 30% of the time said structure is in use.

8. A system for reducing fouling on an aquatic structure comprising:
an aquatic structure comprising at least one surface exposed to water when the structure is in use;
a concave region on at least one portion of the surface exposed to water wherein said concave region is configured to maintain a substantially non-contiguous physical separation between water and said region.

9. The system of Embodiment 8 wherein the volume beneath said concave region is adjustable.

10. The system of Embodiment 8 wherein the surface area of the concave region is adjustable.

11. The system of Embodiment 8 wherein the height of the concave region relative to water is adjustable.

12. The system of Embodiment 8 wherein at least one of the volume beneath said concave region, the surface area of the concave region, or the height of the concave region above water, is adjusted by changing the surface morphology of or on the concave region.

13. The system of Embodiment 8 wherein at least a portion of the surface exposed to water is substantially hydrophobic.

14. An improved aquatic structure comprising:
a structure comprising at least one surface exposed to water when the structure is in use wherein the improvement comprises:

configuring at least a portion of said surface exposed to water such that said portion has a non-contiguous separation with water when the structure is in use and wherein the portion having a non-contiguous separation with water provides a gas pocket between said portion and water when the structure is in use.

15. The improved aquatic structure of Embodiment 14 wherein the amount of substantially non-contiguous physical separation with water of the surface exposed to water is controlled by adjusting the amount of gas in the pocket.

16. The improved aquatic structure of Embodiment 14 wherein said non-contiguous separation is present greater than 30% of the time said structure is in use.

17. The improved aquatic structure of Embodiment 14 wherein said portion configured to be non-contiguous reduces visible fouling by at least 50% as compared to a similar structure lacking said non-contiguous portion.

18. The improved aquatic structure of Embodiment 14 wherein the amount of gas in the pocket is adjustable.

19. The improved aquatic structure of Embodiment 14 wherein the volume of the gas pocket is adjustable.

20. The improved aquatic structure of Embodiment 14 wherein the surface area or volume of the non-contiguous separated portion is adjustable.

21. The system of Embodiment 14 wherein the height of the non-contiguous separated portion with respect to water is adjustable.

Embodiments for "Low Density Fluid Displacement to Generate Power"

1. A system for generating electricity comprising:
a first storage reservoir near the surface of a body of water and configured to store a low density fluid which is substantially immiscible with water;
a second storage reservoir located below the surface of a body of water and configured to store water; a pump; and a generator;
wherein the pump, generator, and the first and second reservoir are operatively connected such that electricity is stored by displacing water in the second storage reservoir by pumping low density fluid in the first storage reservoir to the second storage reservoir and electricity is generated (or discharge) by allowing the low density fluid in the second storage reservoir to return to the first reservoir.

2. The system of Embodiment 1 wherein the pump and the generator may be the same unit.

3. The system of Embodiment 1 wherein said second storage reservoir comprises an expandable or contractible structure.

4. The system of Embodiment 1 wherein said second storage reservoir comprises a bladder, a bag, or a balloon.

5. The system of Embodiment 1 wherein said second storage reservoir contains a concave region with an opening near the bottom of said concave region open to the body of water.

6. The system of Embodiment 1 wherein said second storage reservoir is tethered to the bottom of said water body.

7. The system of Embodiment 1 wherein the low density fluid comprises a hydrocarbon liquid or natural gas.

8. The system of Embodiment 1 wherein the low density fluid comprises compressed natural gas or liquid natural gas.

9. The system of Embodiment 1 which is operatively connected to a unit requiring electricity.

10. A process to generate energy comprising:
storing energy by displacing at least a portion of a first fluid having a first density with a second fluid having a second density which is lower than said first fluid wherein said first and second fluid are substantially immiscible in each other;
allowing a power discharge by displacing at least a portion of the lower density second fluid with the first higher density fluid;
wherein said generating step, allowing step, or both are facilitated by pressure and gravity.

11. The process of Embodiment 10 wherein said generating step, allowing step, or both occur beneath a surface of water wherein said water is employed to facilitate pressure.

12. The process of Embodiment 10 wherein said first fluid is water.

13. The process of Embodiment 10 wherein said second fluid comprises compressed natural gas, liquid natural gas, liquid hydrocarbon, petroleum ether, or crude oil.

14. The process of Embodiment 10 wherein the second fluid having a second density is stored near the surface of a body of water.

15. The process of Embodiment 10 which further comprises converting the power discharge to electricity.

16. The process of Embodiment 10 which further comprises storing said power discharge.

17. The process of Embodiment 10 which further comprises converting the power discharge to electricity.

18. The process of Embodiment 10 wherein the first or second fluid comprise a waste fluid.

19. The process of Embodiment 10 wherein the first or second fluid comprise a fluid generated from a solid waste.

20. The process of Embodiment 10 wherein the first or second fluid comprise a cooking oil.

Embodiments for "Underwater Energy Storage and Electricity"

1. A process for generating electricity from tides comprising:
providing a cavity which is operatively linked to tidal waters and configured such that air is displaced with water at higher tides and such that water is displaced with air at lower tides;
displacing at least a portion of air within the cavity with water at higher tides;
displacing at least a portion of water within the cavity with air at lower tides;
wherein the displacing of water, air or both generates power.

2. The process of Embodiment 1 wherein the cavity is open on bottom.

3. The process of Embodiment 1 further comprising transferring at least a portion of displaced air to a pneumatic generator.

4. The process of Embodiment 1 which further comprises controlling the flow rate of air during displacing of air.

5. The process of Embodiment 1 which further comprises controlling the flow rate of water during displacing of air.

6. The process of Embodiment 1 wherein the cavity is above ground.

7. The process of Embodiment 1 wherein the cavity is below ground.

8. The process of Embodiment 1 wherein the cavity is at least partially submerged in a tidal water body.

9. The process of Embodiment 1 further comprising transferring at least a portion of displaced air to a pneumatic generator through one or more pipes.

10. The process of Embodiment 1 wherein the cavity comprises a flexible liner.

11. The process of Embodiment 1 wherein the cavity is rigid.

12. The process of Embodiment 1 wherein the cavity is expandable or collapsible.

13. The process of Embodiment 1 which is configured such that power generated at higher tides exceeds any power consumed during lower tides.

14. A process for generating electricity from tides comprising:
provide a cavity which is at least partially filled with a porous material and air which cavity is operatively linked to tidal waters and configured such that air is displaced with water at higher tides and such that water is displaced with air at lower tides;
displacing at least a portion of air within the cavity with water at higher tides;
displacing at least a portion of water within the cavity with air at lower tides;
wherein the displacing of water, air or both generates power.

15. The process of Embodiment 14 wherein the porous material comprises sand, gravel, rock, packing material, or cinderblock, or plastic bottles, or plastic containers, or plastic buckets, or interconnected cinderblock, or interconnected plastic containers, interconnected packing material, or mixtures thereof.

16. The process of Embodiment 14 wherein the cavity comprises a flexible liner.

17. The process of Embodiment 14 wherein the cavity is rigid.

18. The process of Embodiment 14 wherein the cavity is expandable or collapsible.

19. The process of Embodiment 14 further comprising transferring at least a portion of displaced air to a pneumatic generator.

20. The process of Embodiment 14 which further comprises controlling the flow rate of water during displacing of air.

What is claimed is:

1. A process for generating electricity from tides comprising:
providing a cavity comprising a porous material and air within the porous material, wherein said cavity is operatively linked to tidal waters such that at least a portion of the air within the porous material is displaced with tidal water at higher tides and such that tidal water within the porous material is displaced with air at lower tides;
displacing at least a portion of the air within the porous material with tidal water at higher tides; and
displacing at least a portion of the tidal water within the porous material with air at lower tides;
wherein the displacing of water, air or both generates power.

2. The process of claim 1 wherein the porous material comprises sand, gravel, rock, packing material, or cinderblock, or plastic bottles, or plastic containers, or plastic buckets, or interconnected cinderblock, or interconnected plastic containers, interconnected packing material, or mixtures thereof.

3. The process of claim 1 wherein the cavity comprises a flexible liner.

4. The process of claim 1 wherein the cavity is rigid.

5. The process of claim 1 wherein the cavity is expandable or collapsible.

6. The process of claim 1 further comprising transferring at least a portion of the displaced air to a pneumatic generator.

7. The process of claim 1 which further comprises controlling the flow rate of the water during displacing of the air.

* * * * *